United States Patent [19]
Denne

[11] Patent Number: 5,440,183
[45] Date of Patent: Aug. 8, 1995

[54] ELECTROMAGNETIC APPARATUS FOR PRODUCING LINEAR MOTION

[75] Inventor: Phillip R. M. Denne, Bournemouth, United Kingdom

[73] Assignee: Denne Developments, Ltd., Bournemouth, England

[21] Appl. No.: 182,079

[22] PCT Filed: Jul. 13, 1992

[86] PCT No.: PCT/GB92/01277
§ 371 Date: Jan. 12, 1994
§ 102(e) Date: Jan. 12, 1994

[87] PCT Pub. No.: WO93/01646
PCT Pub. Date: Jan. 21, 1993

[30] Foreign Application Priority Data

Jul. 12, 1991 [GB] United Kingdom ............... 9115180
Dec. 2, 1991 [GB] United Kingdom ............... 9125614

[51] Int. Cl.⁶ .............................................. H02K 41/02
[52] U.S. Cl. ........................................................ 310/12
[58] Field of Search ................................. 310/12, 14

[56] References Cited

U.S. PATENT DOCUMENTS

| | | | |
|---|---|---|---|
| 4,485,974 | 12/1984 | Lass | 241/30 |
| 4,714,300 | 12/1987 | Heess et al. | 303/115 |
| 5,166,563 | 11/1992 | Bassine | 310/15 |
| 5,175,457 | 12/1992 | Vincent | 310/15 |

FOREIGN PATENT DOCUMENTS

| | | | |
|---|---|---|---|
| 0221228 | 5/1987 | European Pat. Off. | |
| 0280743 | 11/1988 | European Pat. Off. | |
| 0314493 | 5/1989 | European Pat. Off. | |
| 2229711 | 1/1974 | Germany | |
| 85-040058 | 9/1986 | Japan | |
| 61-285060 | 12/1986 | Japan | 310/12 |
| 63-073867 | 4/1988 | Japan | 310/12 |

*Primary Examiner*—Steven L. Stephan
*Assistant Examiner*—Judson H. Jones
*Attorney, Agent, or Firm*—Watson, Cole, Grindle & Watson

[57] ABSTRACT

An electromagnetic piston and cylinder device for producing linear motion has a cylinder provided with a plurality of magnetic devices along its length for producing radial magnetic fields of alternative polarity. The piston is also provided with at least one magnetic member producing a further radial field and there is control means for carrying piston radial field or the cylinder radial fields to alternate whereby to cause relative movement between the piston and cylinder. The piston and cylinder device is preferably sealed but connected to a fluid reservoir whereby the device operates as a combined spring and actuator.

22 Claims, 16 Drawing Sheets

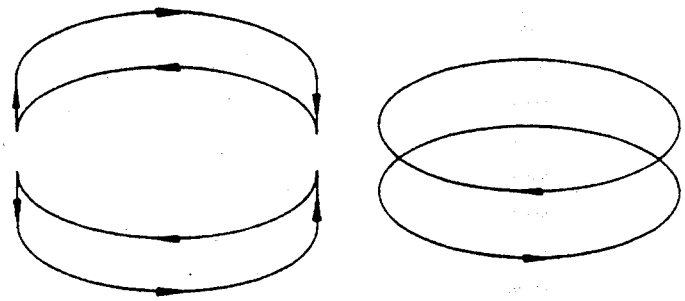
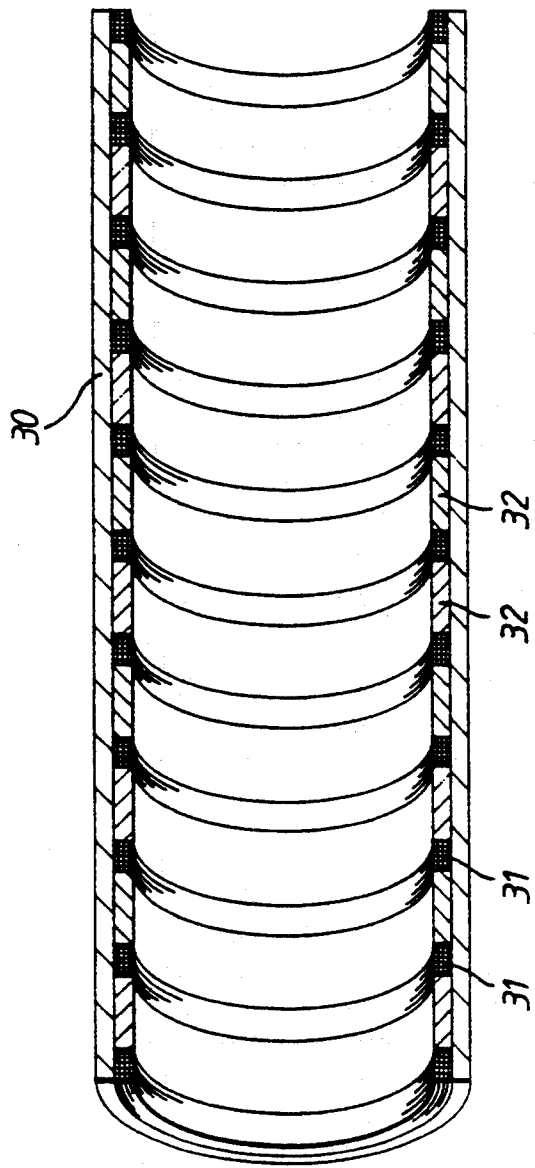
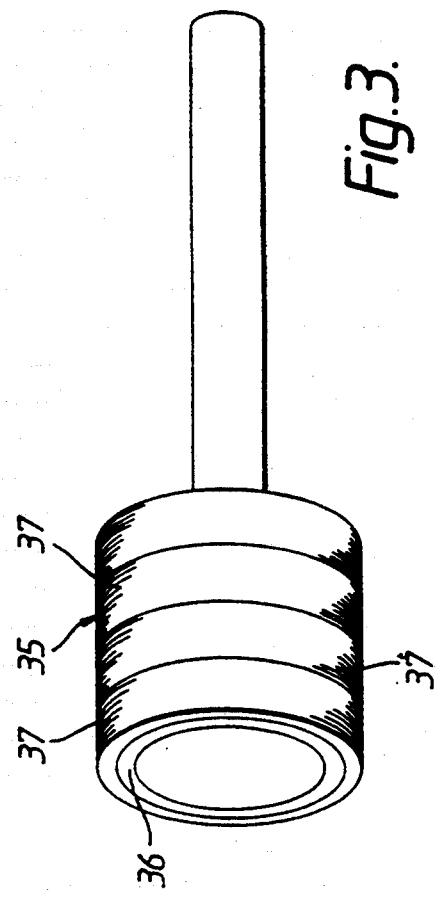
Fig. 3.

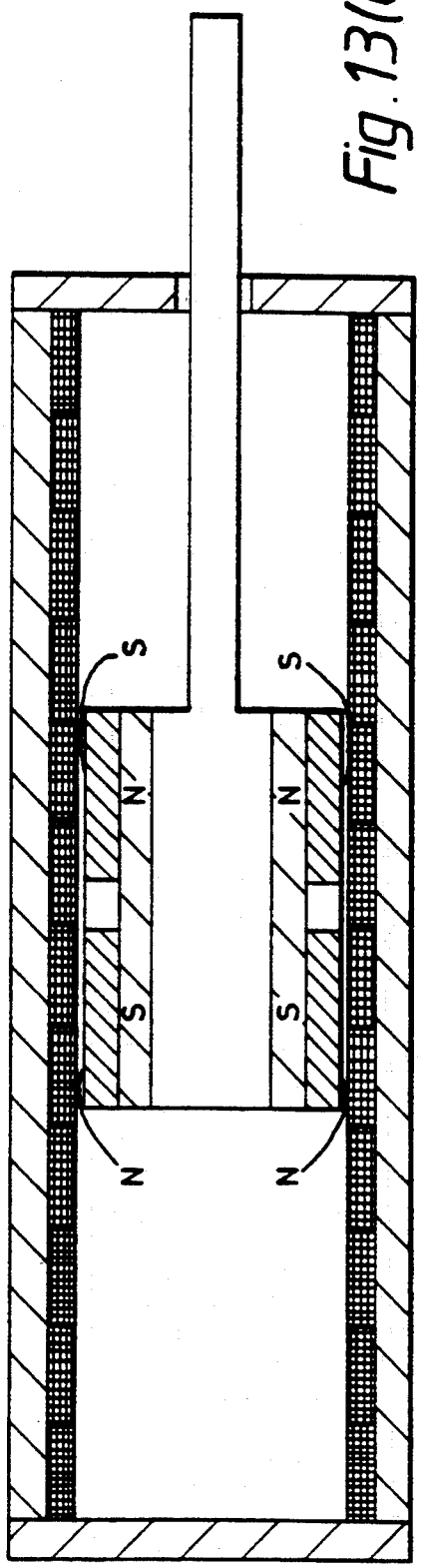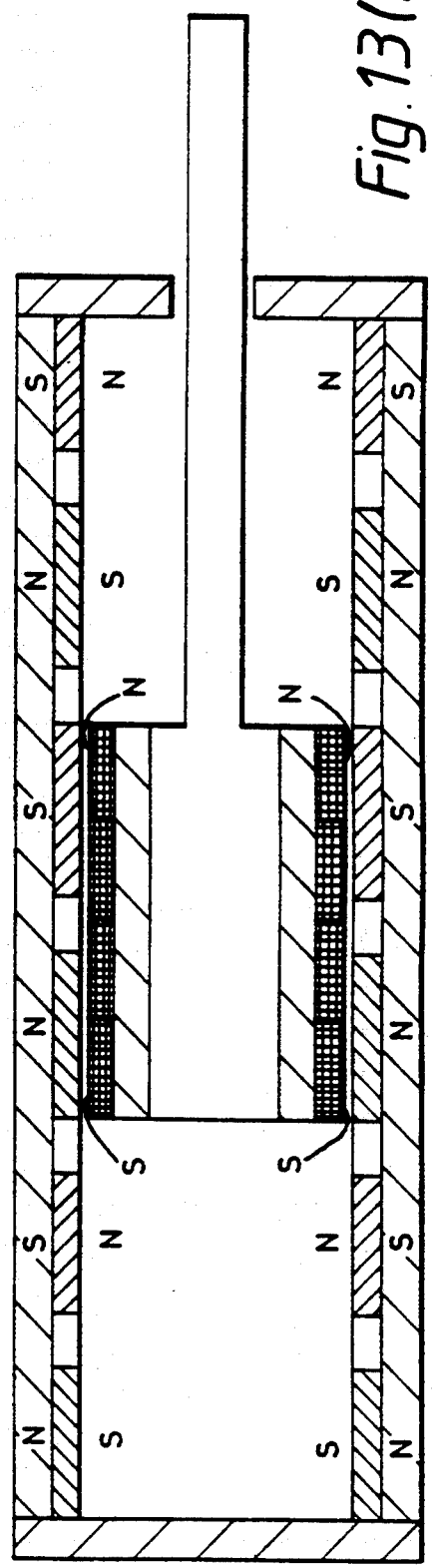
Fig.13(a).
Fig.13(b).

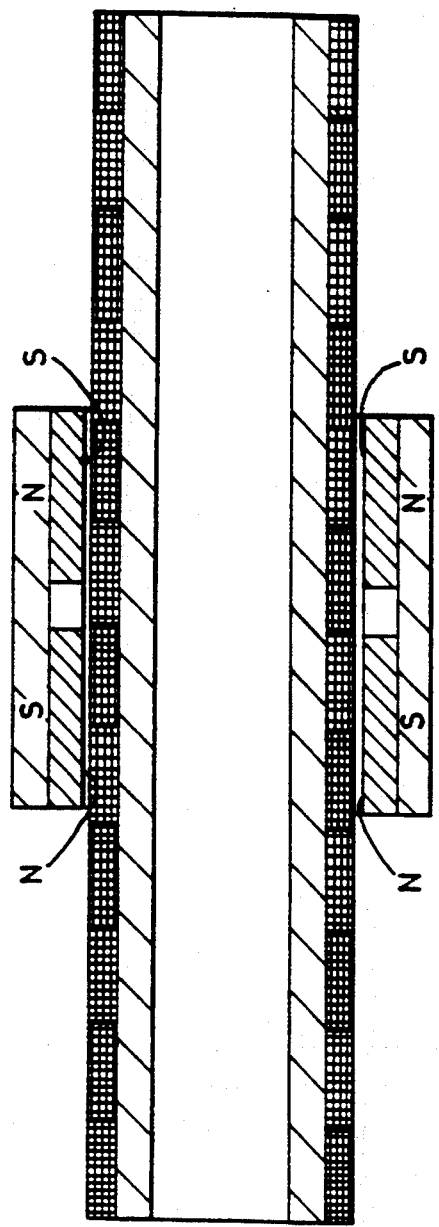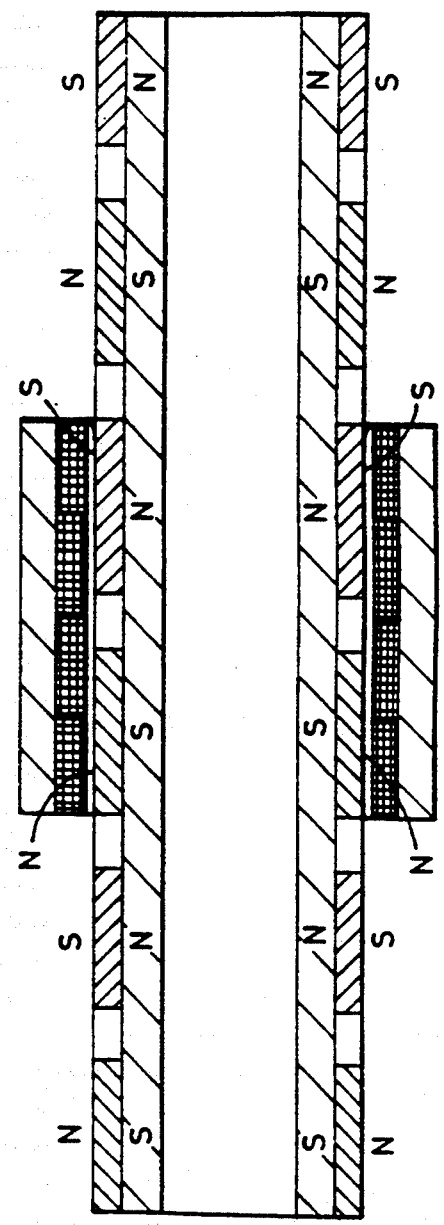

SHOWS OFFSET CYCLIC COMMUTATOR CONTACTS

MAGNET/SPACER ARRAY
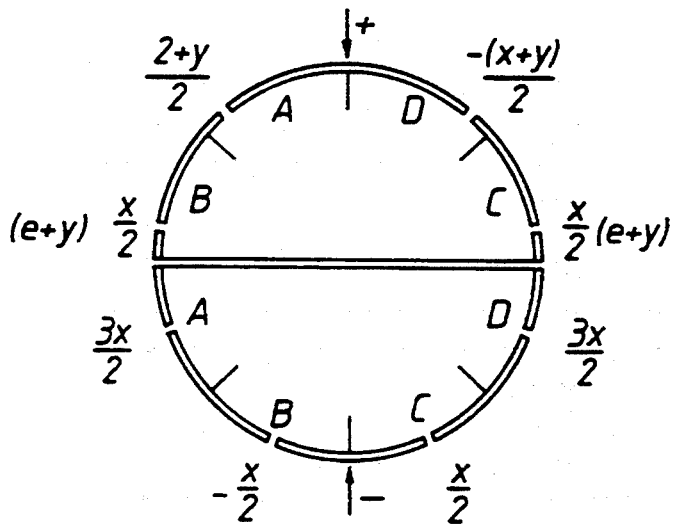
Fig.16

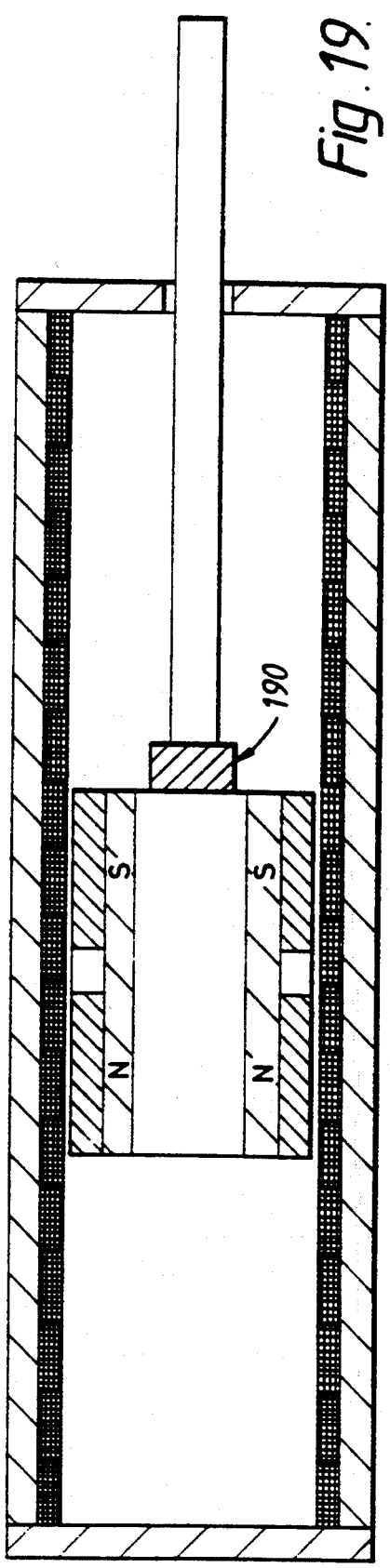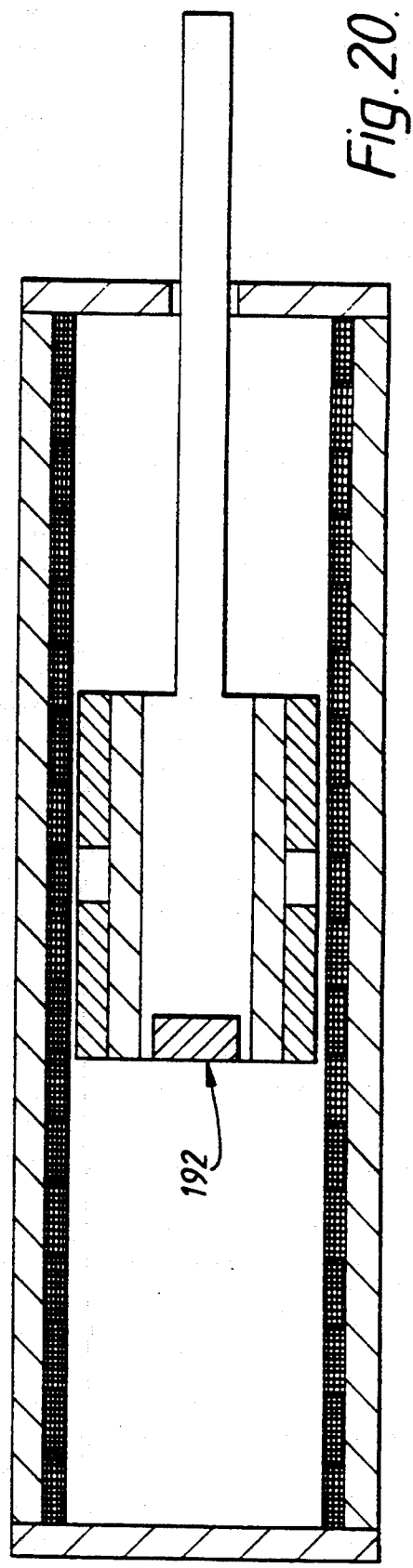

ELECTROMAGNETIC APPARATUS FOR PRODUCING LINEAR MOTION

The present invention relates to electromagnetic apparatus for producing linear motion.

The conventional way of producing linear motion is by using a hydraulic or pneumatic piston and cylinder device or by using a rotational device such as an electric motor with a rotary to linear transformation mechanism. Each solution has its strengths and weaknesses. In recent years a further solution, the dc or ac linear motor, has been used particularly where precise positioning of a movable load is required as a linear motor avoids the need for a rotary to linear transformation mechanism. A disadvantage of the linear motor is that it produces an actuator which is asymmetrical with a strong force imbalance between the armature and the stator in that they are mutually attracted. Further, linear motors have been designed to be placed in a horizontal position, driving the load along tracks or bearings within or alongside of the motor.

The present invention is intended to provide anelectromagnetic apparatus for producing linear motion which must be capable of causing linear motion at angles between the horizontal and the vertical and be totally enclosed without any significant stray magnetic fields.

Preferably, no clamping forces or special straps should be required or the apparatus.

The preferred embodiment of the present invention is an electromagnetic device arranged to operate as a piston and cylinder device. Conceptually, the stator of the device can be considered as being the stator of a conventional motor slit along a plane passing through the axis of the armature and unrolled. The uncut ends of the stator are now brought together to produce a tubular stator forming a cylinder. The piston member is provided with ring shaped magnetic portions.

This results in a device which has the following features:

(a) Attitude independent. Whilst generating thrust the actuator is capable of swinging through large angles horizontally and vertically.

(b) Totally-enclosed. The actuator is capable of operating in an unfriendly (oily, wet and/or unclean) environment and there are no significant stray magnetic fields from the actuator in any position of the force rod.

(c) Axially-symmetric. There are no clamping forces or special shapes of the actuator system which make it difficult to operate in any position or rotation of the axial rod. Preferably the thrust rod shall be free to rotate.

(d) Medium-stroke. Strokes from 0.2 meters to 1 meter are easily provided and it is possible to construct a ram with a 3 meter stroke.

(e) Power-efficient. One of the principal advantages is that the ram has a high electrical to mechanical efficiency ratio. Mere generation of adequate thrust without regard to power consumption isunsatisfactory.

(f) Simple and low cost. The operating conditions for the machines which we conceive as the first markets for these actuators are such that reliability has a very high level of importance. The actuator has a minimum number of moving parts and wear components such as sliding seals and bearings.

Further, such a device can be used in the construction of a combined electromagnetic/pneumatic actuator. The pneumatic part of the actuator provides a static force which may be sustained indefinitely with little or no power consumption whilst the electromagnetic part, working simultaneously, is capable of providing extremely fast changes in net actuator force and therefore providing the control and precision which are missing from the pneumatic actuator above.

Depending on the application, the pneumatic part may be replaced by a different compressible fluid. It should be noted that the fluid within the cylinder actuator does not itself need to be compressible providing that it is connected directly to a reservoir filled with air or other compressible gas whose pressure is modified by the movement of the non-compressible liqid, so that the liquid itself appears to be compressible. Alternatively the fluid in the actuator may be constrined by a sprinloaded piston or other compliant surface of a reservoir.

In order that the present invention be more readily understood, embodiments thereof will now be described by way of example with reference to the accompanying drawings, in which:

FIGS. 3 and 4 show the actuator of FIG. 2 in more detail;

Figure 2:
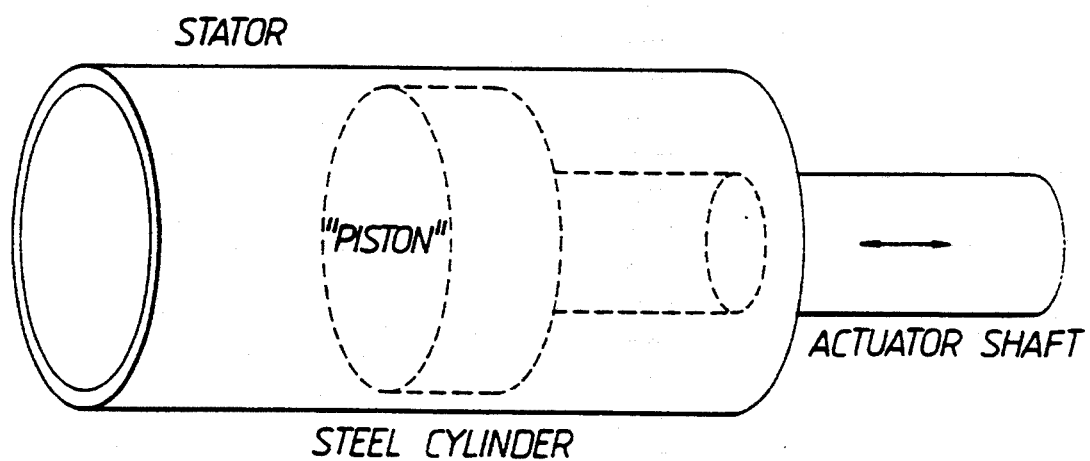
FIG. 2 shows diagrammatically the basic concept of an electromagnetic actuator according to the present invention.
Figure 12A:
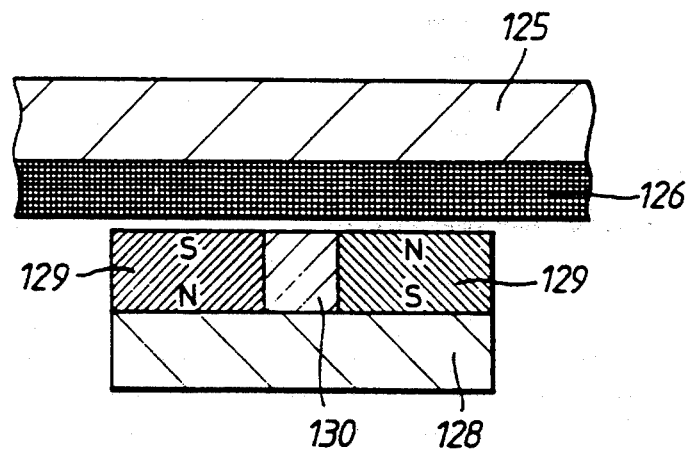
Figure 12B:
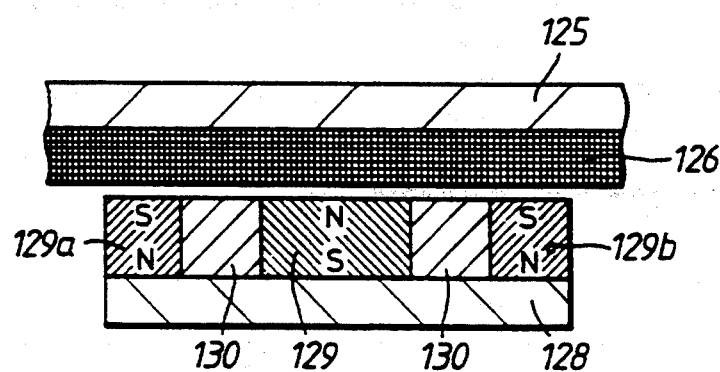
Figure 12C:
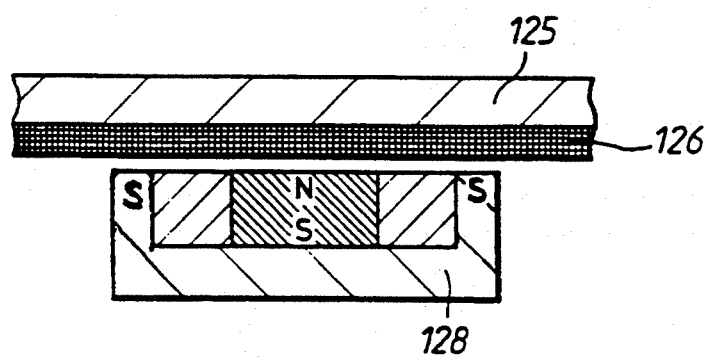
Figure 14:
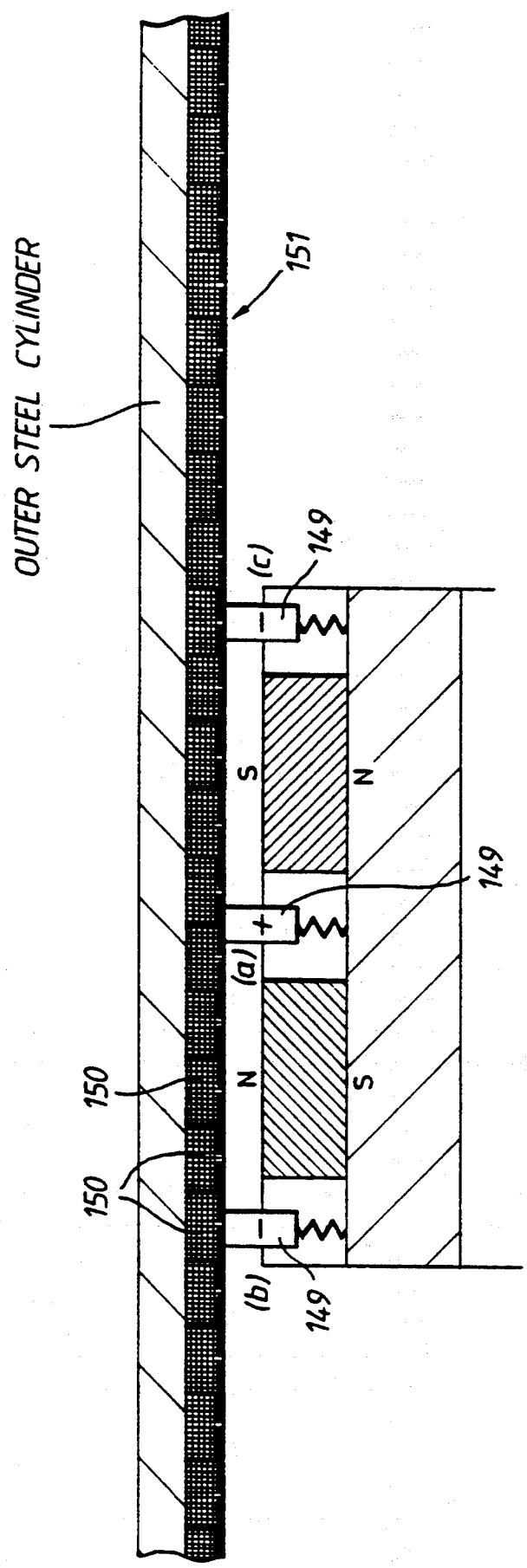
Figure 15A:
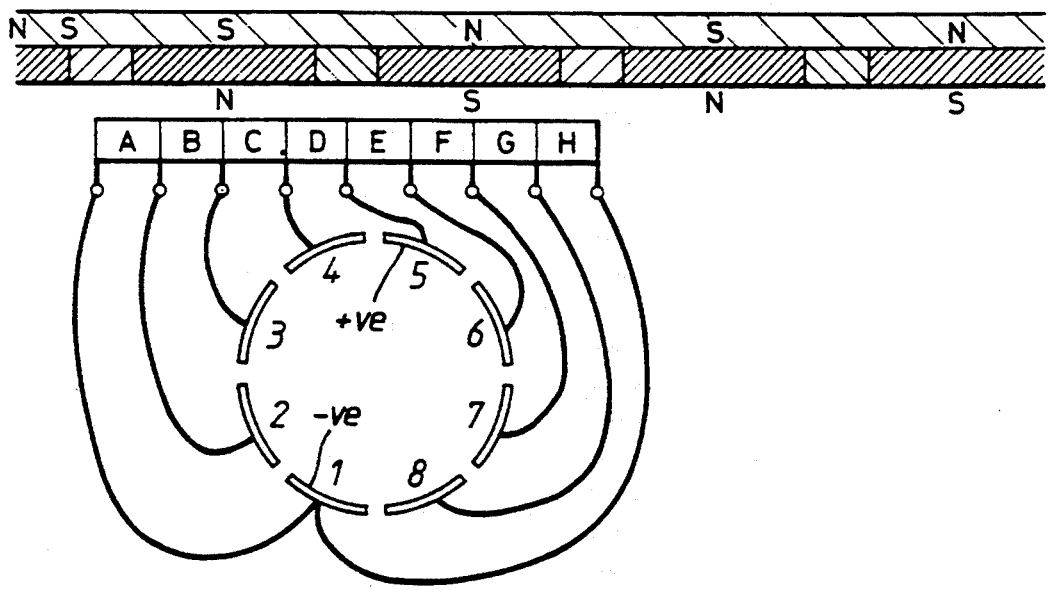
Figure 15B:
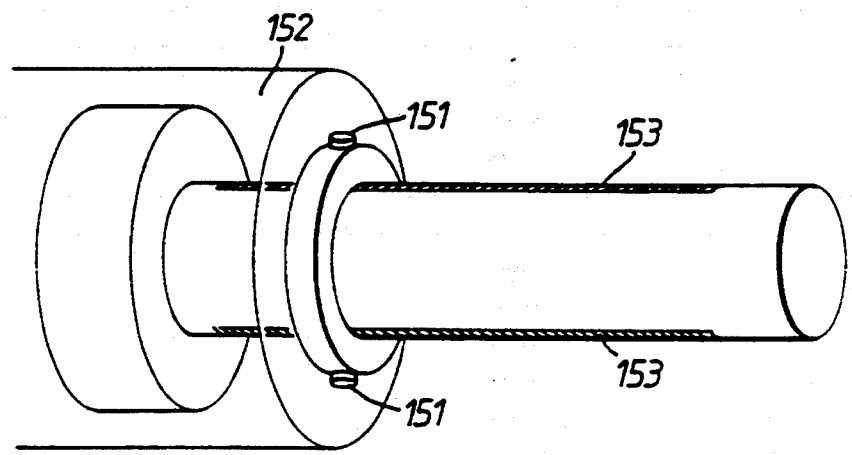
Figure 15C:
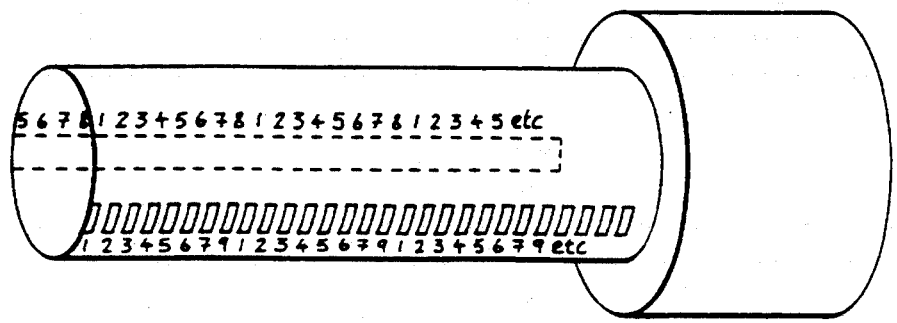
Figure 17:
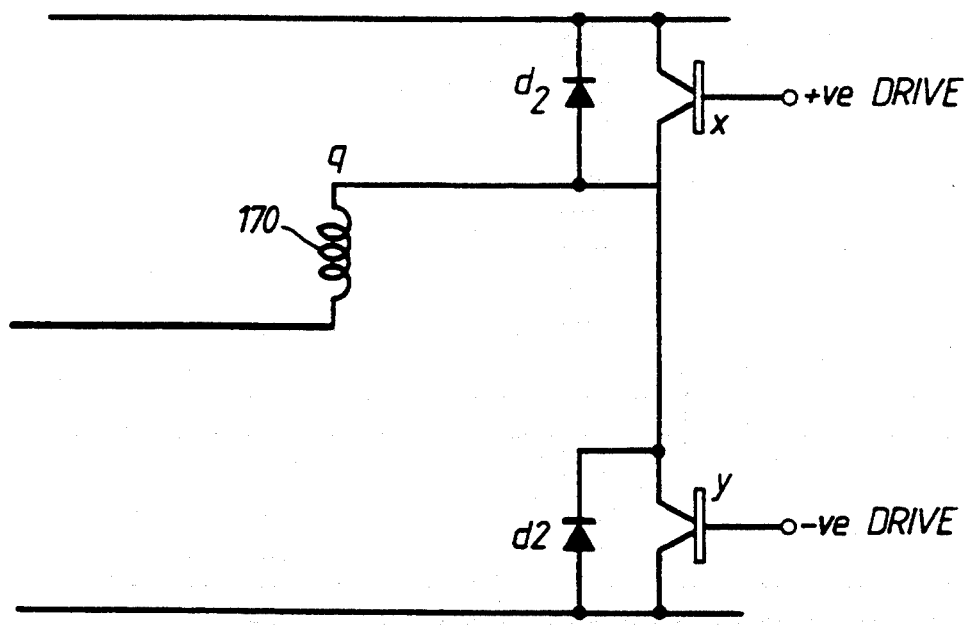
Figure 18:
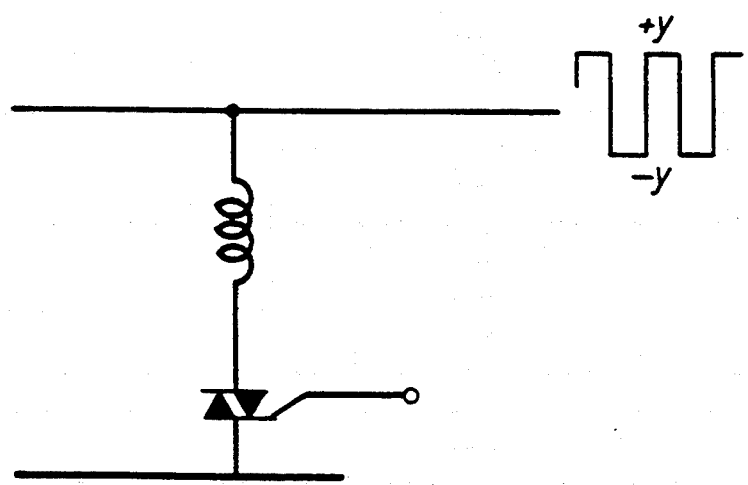
Figure 21:
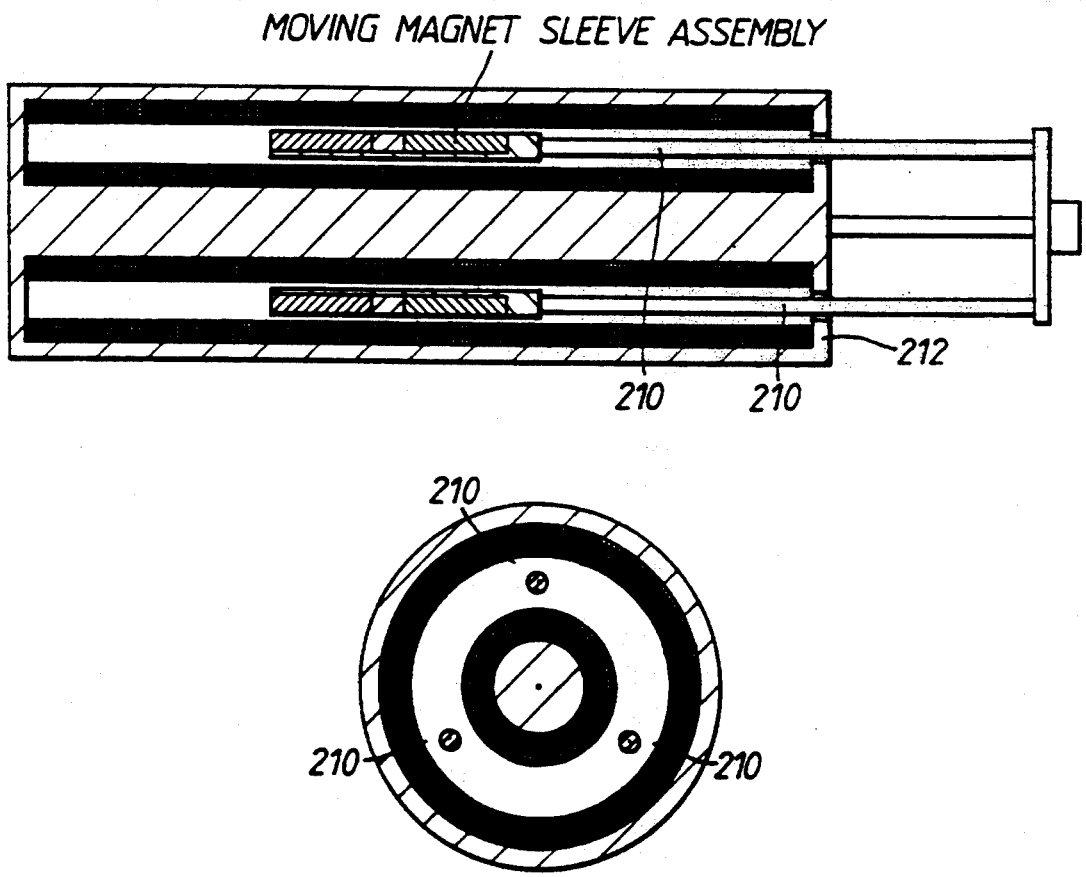
Figure 22:
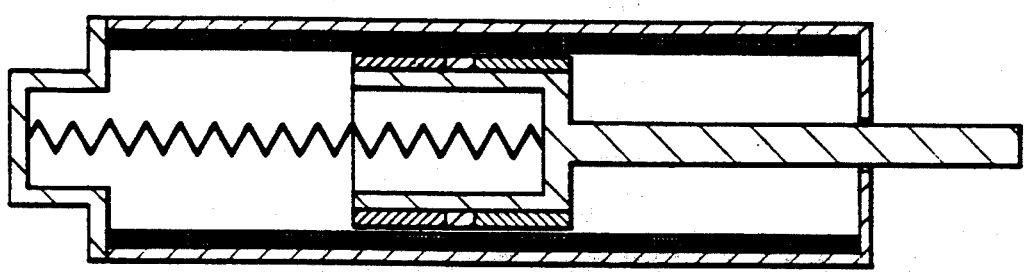
Figure 23:
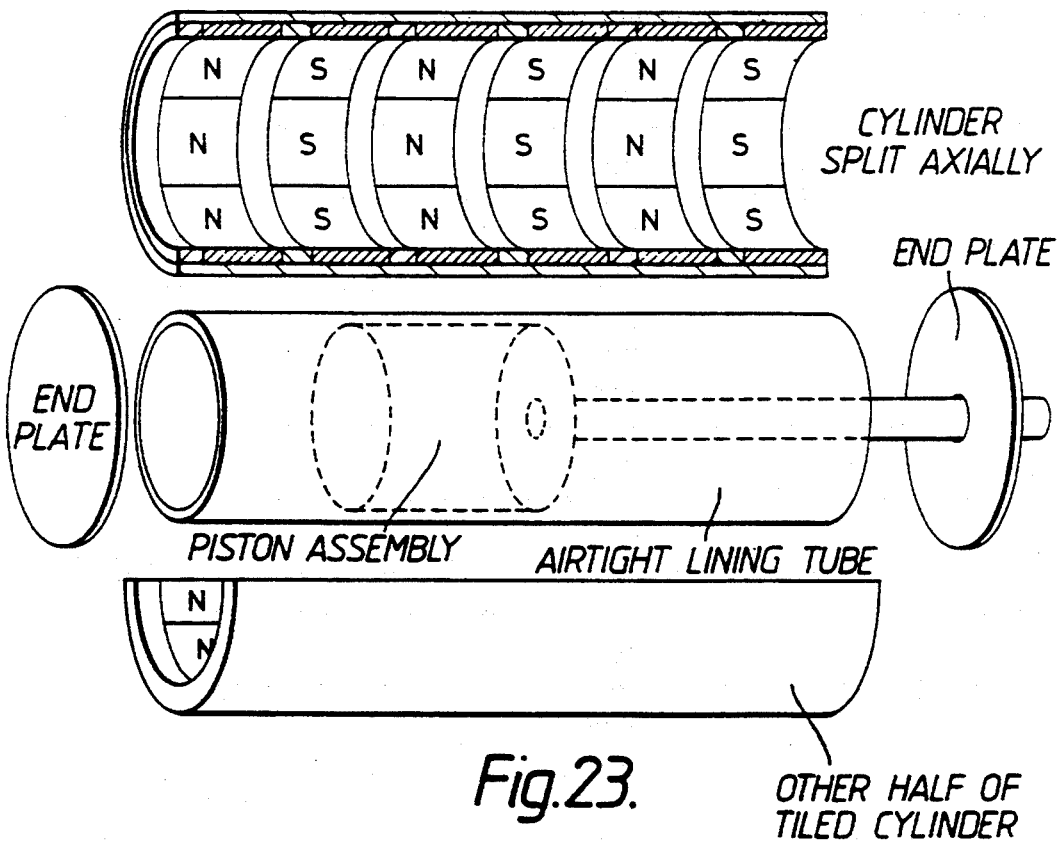
Figure 24:
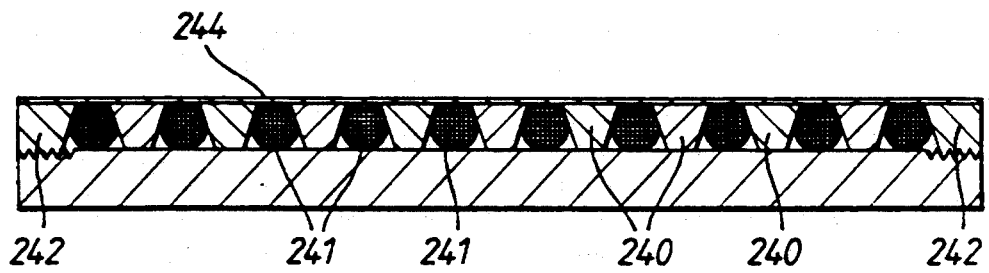
Figure 25:
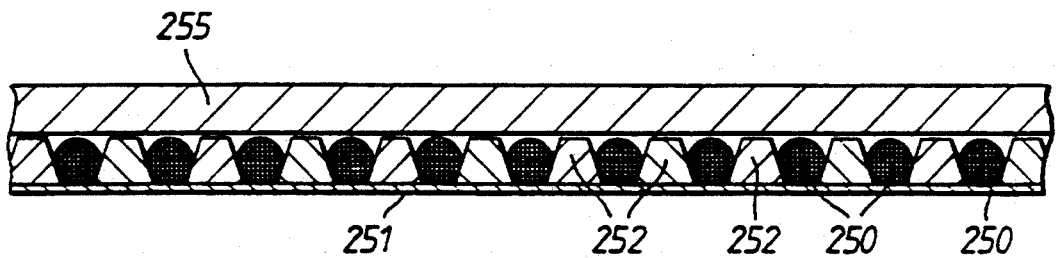

FIGS. 12(a)–12(c) show diagrammatically parts of three configurations for a piston according to the present invention;

FIGS. 13(a)–13(d) show the magnetic layout of four different arrangements of the basic concept shown in FIG. 2;

FIG. 14 shows a basic arrangement of a brush commutator for a moving magnet unit;

FIGS. 15(a)–15(c) show a schematic of mechanical commutation for a moving coil unit;

FIG. 16 shows a diagram of commutation by a 4-coil array as it moves relative to a typical magnet/spacer array;

FIGS. 17 and 18 show alternative drive units;

FIGS. 19 and 20 show alternative feedback arrangements;

FIG. 21 shows a further embodiment of the present invention;

FIG. 22 shows one way in which to provideelectrical connection to a moving piston;

FIG. 23 shows diagrammatically how to assemble a device such as is shown in FIG. 2;

FIG. 24 shows in detail a part of a piston assembly according to the present invention; and FIG. 25 shows in detail a part of a stator assembly according to the present invention.

Electromagnetic Forces

Electromagnetic rams differ from electric motors, not just because the electromagnetic forces are arranged so as to produce linear motion rather than rotational torque, but also because the power is generated by a large force at a slow speed instead of a small force applied at high speed.

Figure 1:
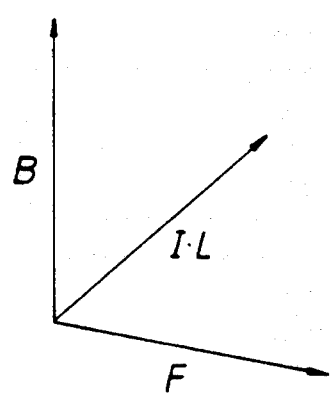
FIG. 1 is a diagram of the basic electromagnetic forces.

The force generated in a magnetic circuit is a product of the magnetic flux B and the electrical current I flowing in a wire at right angles to the magnetic flux of length L (FIG. 1). For large forces it is therefore necessary to think in terms of large currents and large wire lengths.

In MKS units, the force in Newtons is equal to the product of the flux in Tesla, the current in Amperes and the length of the wire in meters. There are a variety of magnetic materials available which have a remanent flux density which varies between 0.4 Tesla and 1.2 Tesla; that is to say, the achievable flux density in the region of the coil will be between 0.15 Tesla and 0.6 Tesla depending on the efficiency of the magnetic material used in the permenent magnet system.

Unfortunately, the cost of the magnet increases very much faster than the rate of increase of flux density. For example, using a ferrite magnet it is possible to generate a field of about 0.2 Tesla in the area of a coil for a cost of perhaps 50 p while to increase that flux to 0.6 Tesla will cost something like €100. It is usually possible to increase the total flux (and therefore the total force which can be produced) by a factor of 3 by increasing the area of the magnet, instead of increasing the flux density in the same area at a very much higher cost. This will increase the weight of the actuatorassembly; it will also increase the inductance of the actuator coils by a factor of 9 and therefore the time constant of the control system by an order of magnitude.

In this document it is the general objective to produce a variety of possible actuation systems using low cost magnetic materials, rather than to produce an especially compact actuation assembly. Since, in some applications, size and control response may be at a premium, due reference is made to the use of high flux density materials.

C. PERMANENT MAGNET SYSTEMS

In permanent magnet systems the magnetic field with which a current in the coil interacts is produced by a series of permanent magnets whose shape and arrangement in conjunction with the steel of the actuator ram determine the key parameters of the actuator design.

Permanent magnet systems have the following advantages:

1. High efficiency. No electrical power needs to be supplied for the generation of magnetic fields by coils with iron pole pieces.

2. Rapid response. The energization of field coils often requires the build up of current in a high inductance coil which takes a significant time and slows the response of the system. In contrast the armature coil is usually of a low inductance design and, if the magnetic field already exists as a result of a permanent magnet circuit, the thrust can be changed much more quickly by varying the current in the "armature".

3. Light weight. Permanent magnet materials are less dense than iron and much less dense than copper, both of which would have to be used in quantity to replace them. It is an advantage in the applications which we consider that the actuator unit shall be relatively light weight.

4. Dynamic braking. The existence of a permanent magnetic field system allows, in principle, the armature to be arranged as a passive element, short-circuited by a chosen value of load resistor so that movement of the armature coil through the permanent magnet fields causes a current to flow which brakes the movement of that coil. By symmetry, dynamic braking is also possible for a moving-magnet piston system, the stator windings then being short-circuited to cause power loss. Such an arrangement is clearly power-efficient, especially so if the dissipated energy can be fed back into the original power supply system.

D. ELECTROMAGNETIC SYSTEMS

Whilst we concentrate the bulk of our design activity at the present time in relation to actuators in the form of piston and cylinder devices which incorporate permanent magnets with the advantages listed in the preceding section, we can see that under some circumstances it may be preferable to replace the permanent magnets by an electromagnet system. The chief advantage of such a configuration is that both the stator and the armature (or "piston") may be supplied from sources of alternating current with a known and controllable phase relationship.

This arrangement has the potential advantage that a connection to a moving part may be made by inductive coupling, removing the requirement for slip rings or commutators in some circumstances. The design may have similar advantages when the actuator is placed within a sealed container or in a corrosive atmosphere where strong electrolytic action is common. DC currents and voltages within such a system would enhance the corrosion whereas the effects of AC voltages of one polarity are cancelled a few milliseconds later by the use of the opposite polarity.

Figure 4:
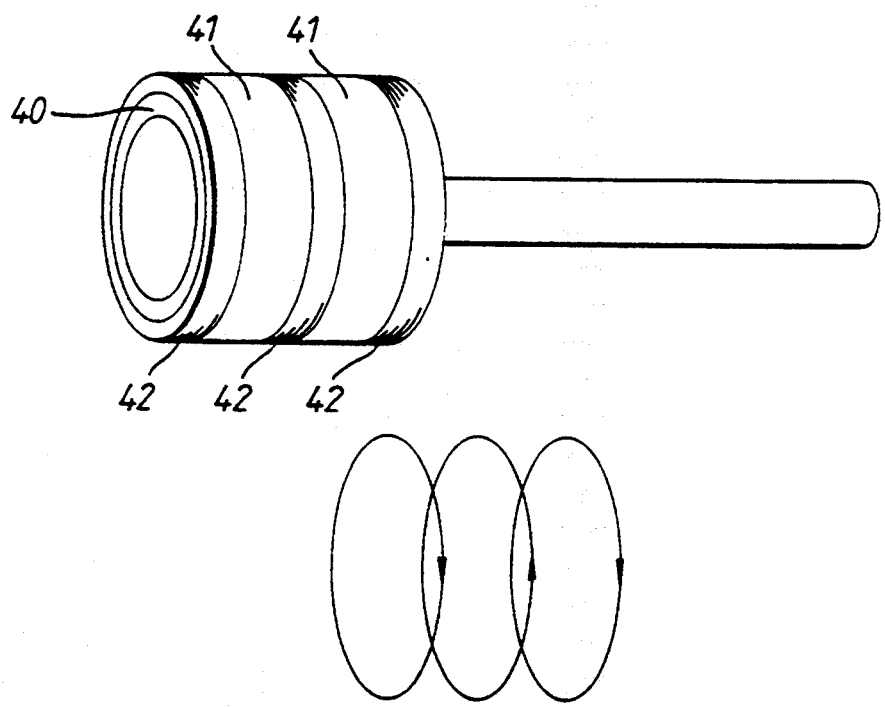

A universal actuator design is shown in FIG. 3, in which a cylinder 30 of a magnetic material such as steel houses a plurality of annular coils 31 which are separated from each other by pole piece rings 32. A piston member 35 slides in the central bore of the cylinder 30 and comprises a cylindrical steel sleeve 336 on the exterior of which are mounted a plurality of segmented windings 37. Currents in the stator windings produce radial magnetic fields which interact with currents in the piston coils, whose phase is controlled according to the position of the piston and the required thrust direction. The mirror image of this design is one in which currents flowing in the piston produce radial magnetic fields which interact with currents in the segmented windings of the stator. The piston of the mirror image design is shown in FIG. 4 where the piston comprises a steel core 40 provided with annular polepieces 41 and coils 42.

E. DC SYSTEMS

The inclusion of a permanent magnet within the actuator does not necessarily imply that the coil element of the actuator must be energized with a DC (that is to say a non-zero mean current per cycle) current system. For example, it is possible to conceive of an actuator in which the piston element of the ram carries permanent magnet(s) which interact with a field of variable frequency which is made to travel up or down the axis of the ram and with which the speed of the permanent magnet system is brought into synchronism. Alternatively, the actuator may be designed to move the piston in steps between magnetic detent positions.

Unless the application of the actuator is very sensitive to hum and/or is resonant under some conditions to a harmonic or sub-harmonic of the mains frequency, it is clearly possible for the actuator to be energized with raw rectified AC (100 Half cycles per second) rather than by a steady DC current with negligible ripple.

The availability of fast switching power transistors also allows us to consider the meaning of "DC" to include a supply of current from a source which consists of a train of unipolar high frequency pulses supplied from a switching transistor.

We take a "DC system" in the context of our designs to mean one in which the magnetic field is unidirectional or time invariant.

Alternatively, the windings of the stator of the design shown in FIG. 3 or FIG. 4 may be energized with DC (steady, pulsed or raw-rectified) to react with currents in the piston, similarly derived and controlled.

F. AC SYSTEMS

We have earlier referred to the potential advantages in difficult circumstances of an AC-powered electromagnetic actuator. The control of the actuator force may now be effected either by variance of the relative phases of the currents flowing in the stator and the piston or by the variation of at least one of the current amplitudes. (If both currents are varied together the force varies approximately as the square of the amplitude.)

It will be clear that when the method of force control is chosen to be that of phase variation, the minimum force (theoretically zero) will be generated when the phases of the two currents differ by 90° and will attain a maximum when the currents are precisely in phase. It is, however, clearly wasteful in terms of energy to supply current to the system when no force is produced.

There is, however, an interesting variation on this technology which allows the design of an actuator which is position-sensitive. That is to say at any chosen position the phase of the current in the piston may be adjusted to be orthogonal to the current in the stator but this will not be so if the piston should move a small distance. The arrangement conceives of a wave travelling down the stator at the same speed as a similar wave propagated in the piston. This does of course imply that the energizing current to both the stator and the piston shall be multi-phase, consisting of at least two phases applied to spatially-separated coil systems. Such a travelling wave can be generated from a single phase supply by a capacitively-tuned coil system in which the current flows 90° out of phase with the current in the directly energized coils.

It will be seen that, with the piston stationary with respect to the stator winding the net effect of the two travelling waves will be to produce steady force on the piston in one direction or another, the amplitude of the force being a function of the amplitude and the relative phase of the currents in the stator and the piston.

Figure 5:
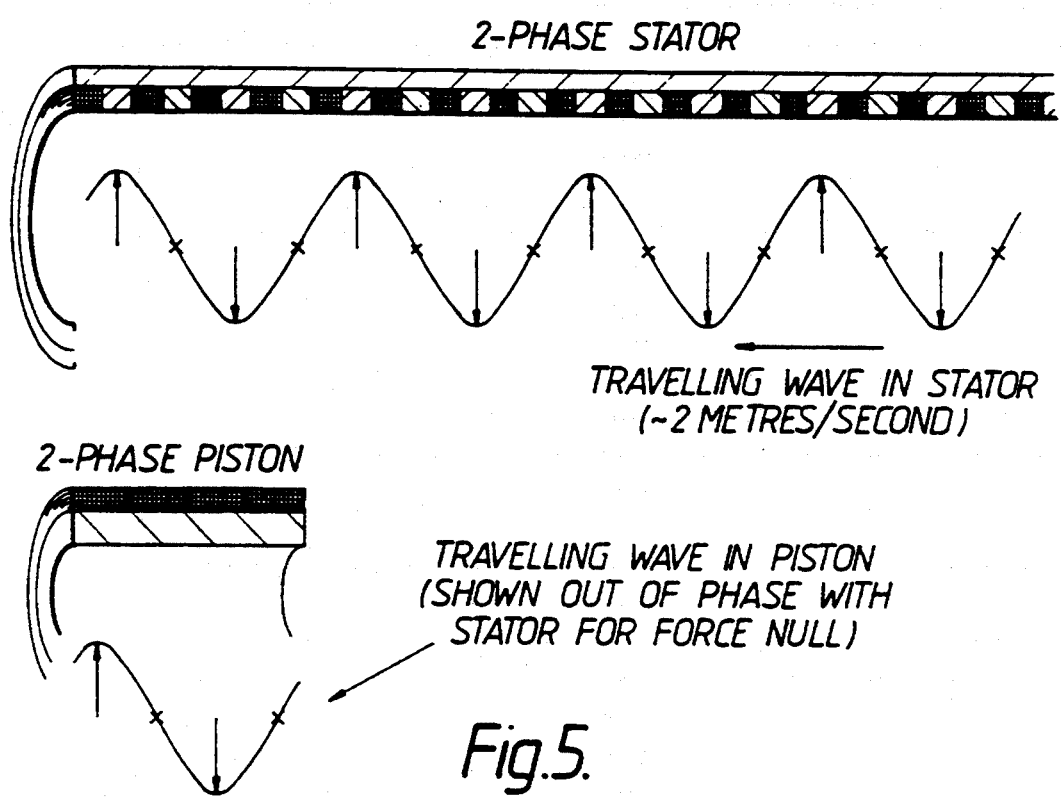
FIG. 5 is a diagram showing the principle of a phase controlled actuator.

Now consider that, the piston being fixed, the phase of the energization of the piston coils shall be adjusted so that the wave travelling across the piston is at all times 90° out of phase with the wave travelling down the stator. There will therefore be no net force between the two systems and, at that position of the piston, no force is generated. This situation is illustrated in FIG. 5.

Nevertheless, if the piston should be displaced to the right or the left then the electromagnetic fields will no longer be orthogonal and a force will be produced on the piston, which for small displacements will tend to return the piston to the original zero force condition. If the piston is displaced by more than 90 (spatial) degrees away from one null force position then the direction of the net force on the piston will be reversed and it will be driven even further away into the next null state.

The characteristics of this form of actuator system provide for an intrinsically-stable position control and a means of generating variable-speed displacements of the piston in either direction without changing the energizing frequency of the actuator itself. (Clearly, a slow phase advance applied to the piston system will cause the piston to drift in the direction of the advancing phase.)

G. INDUCTION ACTUATORS

In the previous section concerned with AC actuator systems we describe the effect of the interaction between a wave travelling down the stator and a wave travelling down the piston in the same direction, showing that, by varying the phase relationship between them the force on the piston can be modulated in a positive or negative sense.

Figure 6:
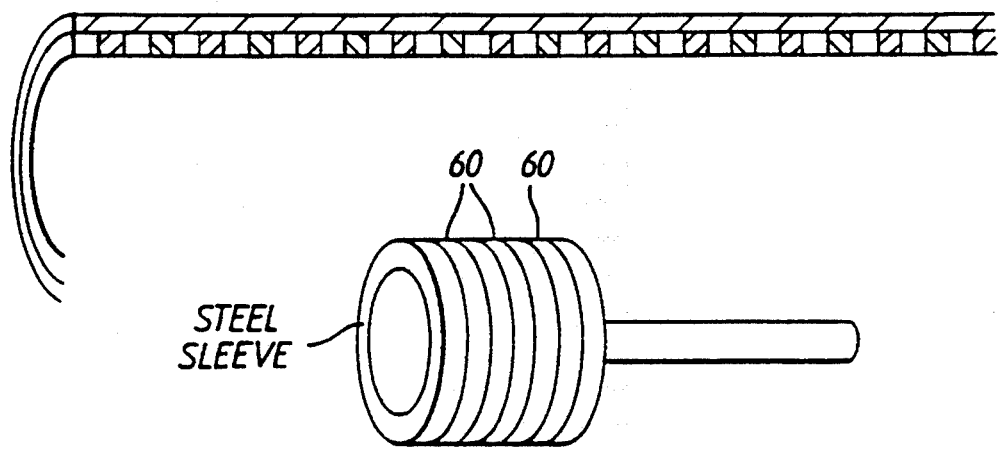
FIG. 6 shows a modification of the basic concept shown in FIG. 2.

It is also possible as shown in FIG. 6 to conceive of a piston coil which is, in effect, a number of sleeves of copper 60 in which currents are induced which tend to drag the piston in the direction of the travelling wave in the stator which is similar to that shown in FIG. 3. The force on the piston may now be varied in strength and in direction by phase and amplitude modulation of one of the stator phases causing it to lead or lag the primary energizing phase and thereby to vary the strength and direction of the induced currents in the piston sleeve coils.

Figure 7:
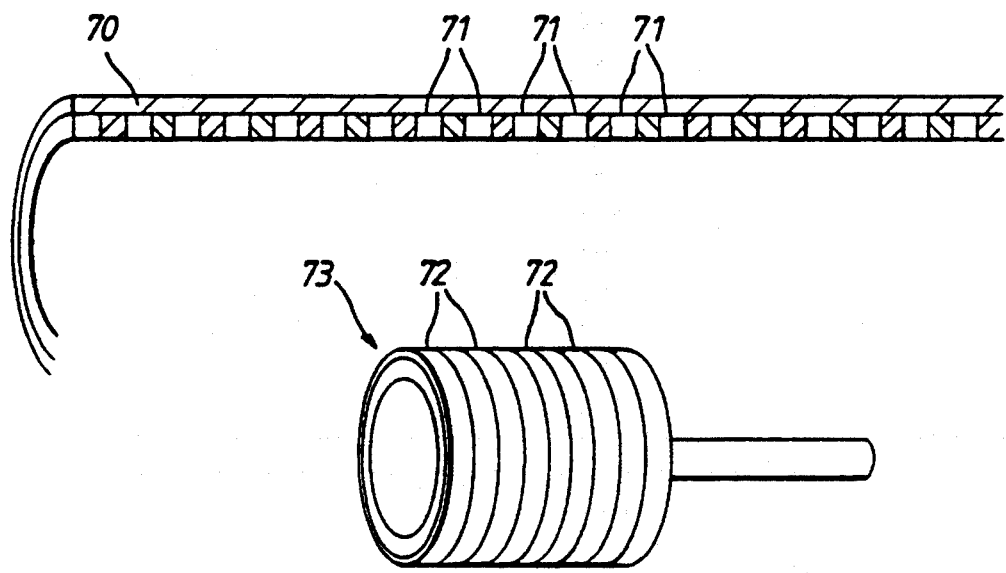
FIG. 7 shows an alternative to the modification shown in FIG. 6.

On a reciprocal configuration as shown in FIG. 7, the stator consists of a steel cylinder 70 having a of a number of copper rings 71 in which current is induced by a travelling wave field produced by 2 or 3 phase coils 72 on the piston 73. Such a configuration is cheaper to make and consumes less electrical power.

H. SERVO INDUCTION COILS

Figure 8:
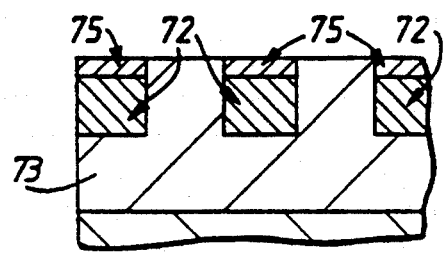
FIG. 8 shows a further alternative to the modifications shown in FIGS. 6 and 7.

A variation on the arrangement described in FIG. 7 is shown in FIG. 8 and one in which the currents flowing in the piston coils 72 are the outputs from power amplifiers whose inputs are derived from sensing coils 75 which pick up the signals from the stator travelling wave system.

The advantage of such a design improvement is that strong interaction between the piston and the stator fields can be maintained when the slip speed is very small because the amplifier can be used to drive the piston current at maximum level when only a small voltage is generated in the pick up coil. (The voltage in the pick up coil is a function of the relative velocities of the piston and the travelling wave in the stator.)

(A reciprocal arrangement is possible, using pick-up coils and amplifier-driven coils in the stator, the piston being energized.)

J. MOVING MAGNET SYSTEMS

By analogy with the loudspeaker system from which the present range of electromagnetic actuators has been derived, the moving element is assumed to be the piston of the combined pneumatic and electromagnetic ram system and the "stationary" element is assumed to be that related to the outside cylinder surface, whether of circular or rectangular cross-section. However, the opportunity is taken here to point out that it may sometimes be convenient to couple the force elements in the reverse sense, so that the piston element is anchored to a stationary object and the moving object is connected to the sleeve. We also point out that the stationary element is not necessarily an external sleeve but may also be a central rod, over which the "piston" element of the actuator is arranged to travel. (Such a design has recently been disclosed by a British company).

Figure 9:
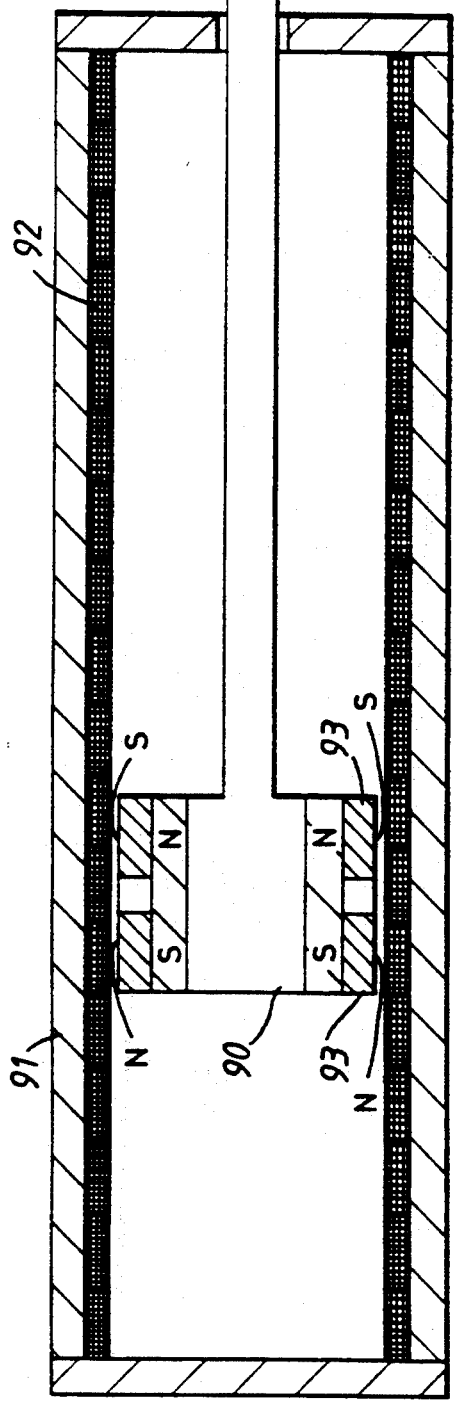
FIGS. 9 and 10 show two implementations of the basic concept shown in FIG. 2.

In the context of this discussion the element which we refer to as the "piston" has a dimension in the direction along which the thrust is applied which is shorter than the dimension of the "stator" in the same direction. By a "moving magnet system" we therefore imply that the dimensions of the element which carries the magnetic field generating parts (whether permanent magnet or electromagnet) is smaller than the element which carries the length of wire on which the magnetic flux is conceived to act so as to generate the required force. FIG. 9 shows such an arrangement where a piston 90 slides in a cylinder 91 which carries annular segmented stator coils 92. The piston 90 carries radially magnetised ring magnets 93.

The essential feature of a moving magnet system is that there must be in the stationary element a means whereby the magnetic flux emanating from the moving magnet may be returned to it by a low reluctance magnetic path. This is sometimes difficult to arrange.

It should also be noted that as the moving magnet element traverses its path of action the flux linkage through components of the stator will change as a result of that movement and the change of flux may be found to generate eddy currents in metalwork associated therewith. Precautions may therefore be necessary to eliminate this eddy current effect, which would cause power to be dissipated in the resistance of the metalwork. Such precautions might include, for example, the interruption of a continuous metallic path by the incision of a slot at right angles to the path in which the eddy current would otherwise flow.

By analogy with the moving coil loudspeaker system the magnetic field is usually conceived to be radial (in a circular magnetic system) or at right angles to the path of motion (in a rectilinear electromagnetic actuator system).

K. MOVING COIL SYSTEMS

Figure 10:
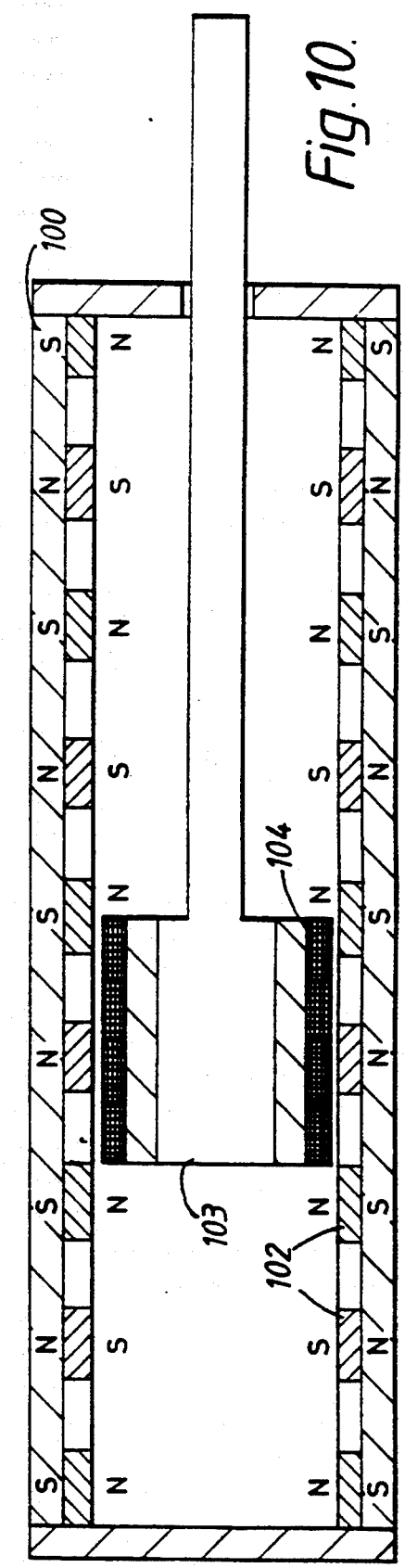

As we have explained in the preceding section, the dimensions of the "moving" parts of the system are assumed to be significantly less than those of the "stator" part of the system. For a long-stroke actuator the choice between a moving coil and a moving magnet system often reduces to a consideration of cost of the magnetic elements versus the cost of the copper coil system. When the magnetic material is expensive it is clearly an advantage to use a small number of magnetic elements as the "piston" and to construct a long assembly of coils as the stator. In contrast, when magnetic material is cheap it may be preferable to produce a long assembly of magnets and to use a small coil assembly on the piston. FIG. 10 shows such an arrangement with the steel stator cylinder 101 carrying a series of ring magnets 102 which are radially magnetised. The piston 103 carries segmented coils 104.

There is also a consideration of the cost of commutation. Where commutation is not directly mechanical—achieved by means of a brush assembly mounted on the moving piston and making connection to a fixed commutator on the stator—a moving coil system is to be preferred. This is because the number of commutated elements in a moving coil assembly is less than the number of elements in a stator, so that the number of solid state switches is also reduced, together with the complexity of their wiring to a controller.

Nevertheless, a moving coil system does imply an electrical connection to a moving part perhaps by a cable which will be subject to wear under continuous flexure. (A commutating brush system will also be subject to wear.)

L. SINGLE SIDED SYSTEMS

The force generated by an electromagnetic actuator is proportional to B.I.L. where B is the flux, I is the current and L is the length of wire. It may therefore be thought to be an advantage to intercept the flux from the magnet twice, once at the north pole and once at the south pole, so as to make available the maximum surface area over which the length of coil may be arranged to interact with the flux and the magnet.

However, it is also necessary to reduce to a minimum the reluctance in the path of the magnetic flux because the effect of such reluctance is to reduce the flux density and therefore the force which is generated by a current carrying coil which the flux intercepts. An optimum is reached when the magnet is operating at its "BH max" point on the magnetization curve of the magnetic material. If the air gap represented by the thickness of the coil is reduced, the flux will increase but the product of current and length will be reduced so that there is no net gain. Conversely, if the air gap is increased so as to include a greater volume of copper in the magnetic flux path, the flux leaving the magnet is reduced and no net gain results.

Because it is difficult to devise a mechanical construction which takes force from a coil system which is arranged on both sides of a magnet system (or vice-versa) it is preferable that one side of the magnet be arranged to have a short high permeability (low reluctance) path and for the other side to incorporate the coil in an air gap system coupled to the force element.

M. CIRCULAR CROSS SECTION ACTUATORS

By analogy with the moving coil loudspeaker system and also with the conventional forms of pneumatic actuator, the general purpose electromagnetic/pneumatic ram may be thought to be of circular symmetry.

As explained in previous sections, the essential difference between the designs of electromagnetic actuator which are discussed in this document and those which have previously been described in the literature is that, although previous designs have conceived of the slicing and unrolling of a conventional electric motor system, the second stage of the topological transformation has not been conceived; namely that of taking the sides of the unrolled motor strip and curving them together to form a long cylinder.

The cylindrical cross section is an advantage when the coil system is wound on the surface of a cylindrical piston or on a cylindrical sleeve which is then inserted in the outer cylinder tube to form a stator.

When the electromagnetic actuator is combined with a pneumatic actuator it is clear that the design of an air sealing system to work with the electromagnetic piston is simplified in a device with a circular cross section; sliding seals of circular cross section are well known and readily available.

Finally, an actuator of circular cross section has the advantage that the actuator shaft may be orientated in any direction relative to the mounting brackets of the external sleeve, subject to the arrangement of electric connections to a moving coil piston if employed.

The disadvantage of an electromagnetic actuator of circular cross section is that the permanent magnets must be arranged in a radial format; that is to say, the shape of the external periphery of the magnet must be circular. Whilst this is not a problem for ferrite magnets having a flux density in the order of 0.2 tesla, it is often a problem for high performance magnets having a flux density in the order of 1 tesla.

N. RECTANGULAR CROSS SECTION ACTUATORS

Figure 11:
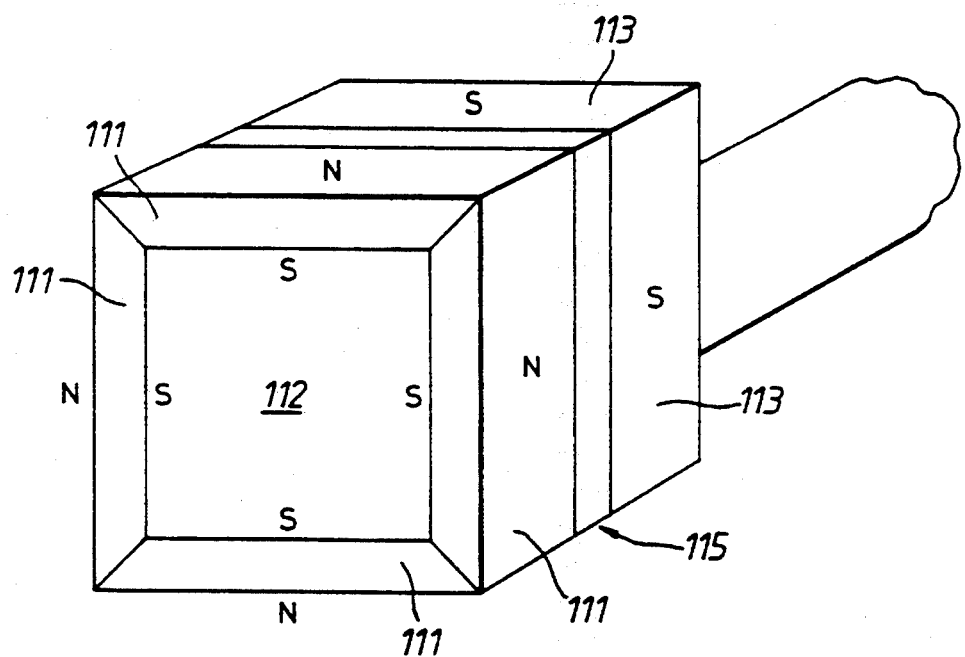
FIGS. 11 and 11a show two constructions of a piston according to the present invention.
Figure 11A:
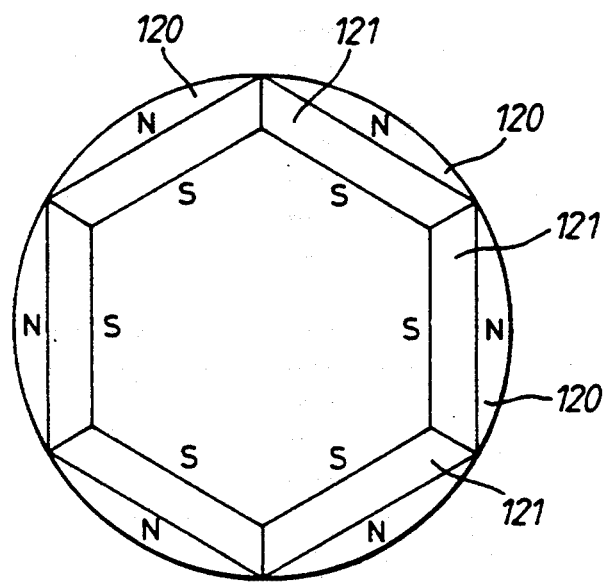

Previous designs by others have described flat electromagnetic actuator systems in which the moving element travels on a bearing above a stator or surface to which it is strongly attracted, producing a strong bearing reaction force. Alternative designs show two plates between which the moving element passes so that the strong downwards force is counterbalanced, but we have not seen the extension of this concept to include left and right hand stators or plates. It will be understood that such a balanced system might be constructed within a steel cylinder of square cross section and using a square "piston" arrangement approximately equivalent to the cylindrical conformation previously discussed. This is shown in FIG. 11 where four rectangular magnets 111 are mounted on a steel core 112 to form a first "ring" whose external periphery has a North pole. A further "ring" is created by four further magnets 113 but the external periphery is now a South pole and the two "rings" are separated by a non-magentic spacer 115.

The advantage of a rectangular cross section system is that magnets of all types are available as rectangular plates, allowing a high performance piston to be designed, intrinsically capable of a higher thrust than that of a comparable ferrite unit. See FIG. 11.

The disadvantage of such systems, as alluded to in the preceding section, is that square cross section pneumatic seals are a problem at the corners of the rectangular piston and it is necessary to ensure that a minimum radius is employed. There is also a difficulty in the control of coil winding machines for rectangular cross section devices in that the tangential speed varies rapidly during the rotation.

Pole pieces may be added to magnets of rectangular cross section so that a circular cross-section is achieved in the complete assembly.

O. DISC/PLATE MAGNETS

In order to produce a radial magnetic field, disc or plate magnets may be arranged back to back between steel pole pieces and form the piston of the device.

All magnetic materials can be produced in the form of plates of circular or rectangular cross section, so that the technique may be universally adopted.

However, because the complementary magnet generates a high opposing magnetomotive force, the flux output from the magnetic material is driven well down its characteristic. Since there is a danger of irreversible de-magnetisation with some magnetic materials, the technique cannot always be employed.

The advantage of the technique is that it is possible to stack a series of magnets in a compact space so as to produce a magnetic field of high density, enabling significant mechanical force to be produced from a coil system of compact dimensions.

Plate magnets can be used in an alternative configuration in a rectangular cross section cylinder unit. In this case the magnets are arranged so that the four plates generate a radial magnetic field on the four faces of the rectangular cylinder as in FIG. 11. The return path of the magnetic flux is via steel pole pieces or via magnets of opposing polarity and of half the width of the main magnet as illustrated in FIGS. 12a, b and c.

In FIG. 12a, the stator cylinder 125 which is preferably of steel, is provided with the segmented stator windings 126. The piston comprises a steel core 128 on which is mounted two magnets 129 separated by a non-magnetic spacer 130 e.g. of aluminium. This produces high thrust with an unbalanced flux path and requires the stator cylinder 125 and the core 128 to be thick.

An alternative arrangement is shown in FIG. 12(b) where the piston arrangement is altered to use a magnet 129 disposed between two half magnets 129 and 129b and separated therefrom by two spacers 130. This provides all the attributes of the arrangement in FIG. 12a but needs thinner steel.

FIG. 12(c) shows a further alternative where the half magnets of FIG. 12(b) are replaced by steel pole pieces. This results in further thrust.

Again, because flat plate magnets can be supplied in any magnetic material, magnets of the latest and most efficient type may be employed to produce actuators of very high efficiency.

P. SEGMENTED MAGNETS

In that the "natural" shape of a piston is conceived to be circular in cross section and the most efficient field configuration is expected to be radial, the ideal form of a magnet in such an actuator system might be thought to be that of a radially-magnetized cylinder. Magnets of this form are theoretically possible in a ferrite such as "Ferroxdure" but there has been no demand for such magnets in other applications.

Nevertheless, magnets which are segments of a cylinder are extremely common and used in electric motors over a wide range of dimensions. A suppliers catalogue for such materials includes many examples of segments having arcs of 160°, 120°, 60° and 50° etc. These magnets may be supplied with the field magnetized north pole inwards or south pole inwards and in a variety of diameters and thicknesses. The magnets are relatively cheap, owing to their large volume use in other applications, so that it is conceivable that the technique can be used in a moving magnet or a moving coil configuration as shown in FIGS. 9 and 10.

The system is shown in the preferred arrangement in which the magnetic fields are wholly contained within the outer steel sleeve of the long stator. FIG. 13a–d illustrate alternative designs.

Q. SINGLE-MAGNET SYSTEMS

We have earlier described systems such as that in FIG. 12c (or its mirror images) in which the magnet is arranged to have two return paths arranged symmetrically on either side of the magnet, thus making it independent of position in a long stroke actuator. The total air gap distance from the pole of the magnet out through the coil to the bounding cylinder and then back through the coil to the flanking pole piece must not be significantly greater than the magnetic length of the energizing magnet. The design has the principal advantage that the piston is relatively compact. However, the density of windings is high for similar reasons, and this increases the complexity of the coil switching system and the cost of the coil arrangement.

R. MULTIPLE MAGNET SYSTEMS

The simplest and most compact piston arrangement is to use two plate (disc) magnets side by side in opposition but separated by steel pole pieces. The advantage of the paired magnet system is that other disc magnet pairs may be assembled to increase the thrust to any desired figure at the expense of piston length.

In the case of the segmented cylindrical magnets which are made in quantity for electric motors and are therefore available at low cost, it is possible to design a long cylindrical sleeve which incorporates alternating rings of such magnets producing a design of moving coil actuator with excellent performance.

S. MOULDED MAGNET SYSTEMS

Certain manufacturers now have the ability to produce a mouldable magnet material with properties similar to those of a Ferrite. This makes it possible to assemble an array of magnets for either the stator or the piston of an actuator from two half cylinder mouldings of the magnetic material, with a significant reduction in actuator assembly time.

(See also the section on Assembly Techniques).

T. SQUARE-WOUND COILS

By "square-wound coils" we mean an arrangement of the windings of the coils which presents the boundary of each coil section at right angles to the axis of thrust so that the movement of a piston carrying a magnetic system through one of these coil segments results in an abrupt transition from zero flux linkage to high flux linkage and visa versa at a later instant.

It might be thought that the control of square-wound coils is difficult in that there is no tolerance of coil switching at an instant which is slightly earlier or slightly later than that in which the transition actually occurs. Such mistiming might be expected to create a perceptible force transient.

However, a study of the mechanism of commutation in, for example, a four-coil fixed magnet design, shows that commutation takes place at a position of near zero coil flux, so that transient forces are acceptable.

U. SKEW WOUND COILS

The tolerance to switching is improved by arranging for the coils to be wound at an angle to the perpendicular to the force axis. Since this would of itself tend to generate a rotational torque on the piston about an axis at right angles to its line of travel, this is compensated by an opposite skewing of the orientation of the magnets. (For a cylindrical actuator concept, a skewing of the magnets on the piston will require an elliptical cylinder cross section.)

V. WAVE WOUND COILS

In a wave wound coil the torque which would be generated by a skew wound coil configuration is counterbalanced by an alternation in the angle of skew during each revolution of the coil, so that in one part of the rotation the skew is to the left and in another part to the right. This effectively spreads the interface of the coil system with the magnets so that the transition becomes smoother and less abrupt and therefore easier to control by means which will be described in later sections of this document.

The disadvantage of this coil arrangement, as indeed for skew wound coils, is that the spreading of the coil effectively reduces the mean flux density in the coil and therefore the thrust per Ampere of current.

W. SLOTTED COIL ASSEMBLIES

In the construction of motor armature assemblies, it is common practice to design the steel core of the rotor so as to fill almost the whole of the internal volume of the motor cylinder, leaving only a small air gap between the periphery of the rotor and the internal surface of the stator iron. This reduces the magnetic reluctance of the motor system to a minimum.

The armature coils are then insulated and fitted into slots which are generally arranged to lie parallel to the axis of the rotor. Although it might be thought that the iron on either side of the slots would effectively shunt the flux away from the armature windings and render them ineffective, this is found not to be the case. The interaction between the magnetic fields due to the stator and those caused by current flowing in the rotor coils then occurs in the iron of the slotted rotor.

The technique has the added advantage that the forces on the wires of the coils are immediately transferred to the steel of the rotor. A similar practice of slotted coil assembly is also applied to the stator windings of electric motors, with equally-beneficial results.

In the diagrams in this document we have, as a general practice, simply shown the coil sections to lie on the surface of the iron core of the piston (for example); they could, however, lie in slots and in FIG. 24 we show an illustration of a piston having a number of iron or steel rings or peripheral ribs 240, forming slots which are perpendicular to the thrust axis of the assembly. These ribs or rings reduce the reluctance of the magnetic circuit and transfer the thrust of the coil windings 241 to the actuator shaft in the same way as the slots of the motor armatures described earlier.

The rings (and the steel of the piston cylinder itself) are arranged to include an axial slot forming a break in their electrical conductance, which would otherwise form a shorted turn coupled to the actuator coils.

It should be noted that the copper coils cannot be pressed into slots in a preassembled armature in the same way as it is possible to do in a rotary motor. They can, however, be preformed as rings 241 which can be stacked alternately with steel rib rings 240 to form an assembly which is then integrated electrically as sections or individually-commutated elements and terminated by clamping end rings 242. A frictionless hearing sleeve 244 e.g. of Teflon can be provided. FIG. 25 illustrates the method for stator construction.

Here, stator coils 250 are assembled on to abn inner non-magnetic sleeve 251 with magnetic rib rings 252 which form slots receiving the coils 250. The assembly can then either be slid into the outer cylinder 255 of magnetic material or clamped between halves of the inter cylinder.

X. MECHANICAL COMMUTATION

It is possible to imagine a moving-magnet system as shown in FIG. 14 which carries three brushes 149a, b and c bearing on commutator segments 150 which select connections to a single layer of copper conductor. It is conceived that along one strip of this conductor the insulation has been removed and the wire has been plated with a hard material to withstand the wearing effects of commutation. Alternatively a technique of coil construction might be devised which welds coil segments 150 at frequent intervals to a printed commutation strip 151 laid into the coil former.

As the magnet assembly moves backwards and forwards down the length of the stator coil, current flows into the central brush 149a and flows in parallel to the left and to the right, leaving the system via brushes 149b and 149c which are together connected to the opposite terminal of the electrical supply. Clearly, current will flow (say) clockwise from a to b and anti-clockwise from b to c, over the face of magnets having an opposite polarity. In this way the thrusts generated in the two coil areas will be equal and additive. Clearly, if more than two magnets are used in the piston assembly, it is possible to conceive of an arrangement of coil segments and commutator brushes which will optimize the thrust generated for any particular configuration.

This is a mechanical commutation arrangement similar to that employed in many motor systems. Its disadvantage is that the brush contacts are not perfect, resulting in power loss and wear. The brush wear generates dust which is not likely to be carried away in the air system of an electro-pneumatic actuator and there is danger of electrical interference which will need to be suppressed. The piston cannot be allowed to rotate within the cylinder, or the brushes will leave the commutator strips.

Nevertheless, the technique is well proven and is suitable for low-cost applications.

A mirror-image system, providing mechanical commutation for a moving-coil piston having eight coil segments is shown in FIG. 15.

Clearly, as the coils move across the faces of the magnets, the direction of current flow must be reversed one section at a time in a manner which repeats over a distance equal to the cycle in magnet configuration—ie over twice (1+y) where 1 is the axial length of the magnet and y is the width of the spacer.

This effect can be produced by the use of two printed circuit commutator strips, set flush with the surface of the thrust rod as shown in FIGS. 15b and 15c. The arrangement has the additional advantage that the power brushes 151 are external to the ram cylinder 152 and that it removes the requirement for flexible wire current connections to the moving piston. The brushes 151 co-operate with commutator strips 153 inset in the thrust rod which in turn is shrouded by a telescopic gaiter (not shown).

Y. CHOICE OF COIL WIDTH

We have described alternative designs of actuator in which an array of magnets of alternating polarity moves relative to a number of coil sections—whose current direction must be chosen in accordance with the instantaneous position of the magnets in relation to the coil sections. The magnets may be fixed and the coils moving or vice-versa.

Assume that the magnets are of axial length l, separated by non-magnetic spacers of axial length y. Assume that there are n coils of axial length x. We need to consider the choice of n and x, given l and y.

Clearly, n cannot be 1, because when x lies symmetrically over any number of alternating magnetic poles, the net flux can be zero—the system will be "dead". The same is true for any coil individually in an array of coils.

Thus, if n is 2, thrust will fall to (less than) 50% of maximum for at least one position; for n=3, less than 67%, and for n=4 less than 75%, by similar considerations. Clearly the variation will continue to decrease as the number of coils increases.

However, as the number of coil sections increases the cost and complexity of the system will also be increased by the number of switching transistors and their control elements. We suggest that for an actuator with solid state commutation a reasonable minimum number of coil sections is 4 and that a maximum is 10.

The length of the coil sections must be chosen to avoid harmonics of the length between centres of the spacers between the magnets, otherwise more than one coil section can be "dead" at the same time.

The total length of the coil assembly should therefore be arranged to cover the distance between the extreme ends of two magnets having a spacer between them i.e. that $n.x = y + 2l$.

Z. HALL-EFFECT COMMUTATION

The disadvantage of the arrangement of magnets as in FIGS. 12a, b or c is that the direction of current in the coils must be reversed from time to time in correspondence with the changing position of the magnet assembly in relation to the coils. For example, in the moving magnet system illustrated in FIG. 9 the coils must be divided into segments and a commutation arrangement must be devised so that as each coil passes from a north pole to a south pole the electrical connections to the coil are reversed.

It is therefore possible to place in the centre of each coil a Hall-effect sensor so that, when the sensor is adjacent to a north pole the current in the coil is arranged to be switched from left to right (for example) and when the coil is adjacent to a south pole the current is arranged to be from right to left. The transition occurs as the Hall-effect sensor passes across the mid-point between the magnets. In a similar manner, the moving coil illustrated in FIG. 10 requires that the coil be subdivided into a number of segments in which the direction of current flow is reversed in a manner which depends upon the relative position of the coil segment and the polarity of the nearest magnetic segment.

(It should be noted that the Hall-effect sensors do not in themselves determine the direction of current flow because the actuator is required to produce accelerations in either direction, independent of precise position and velocity. That is to say, if the actuator is moving to the left and requires to be accelerated further to the left then the current may be positive; but it is also possible that the actuator may be moving to the left and is now required to accelerate to the =right: in this case the direction of current in the coil will be negative.)

POSITION TRANSDUCER COMMUTATION

It will be recognized that the technique of sub-dividing the actuator coil into a finite number of segments and of commutating these segments at appropriate times may also be achieved under microprocessor control if the computer is always aware of the relative positions of the piston and the stator.

Microprocessor-controlled switching has the additional advantage that the approach to the point of current reversal can also be modified to avoid switching transients. Further, it is possible for the microprocessor system to vary the magnitude of the currents in the coil segments so as to smoothe out the force ripple which would otherwise result. For example, FIG. 16 shows a diagram of commutation as a 4-coil array (ABCD) moves relative to a typical magnet/spacer array. In FIG. 16(i) maximum thrust is achieved with peak currents in all coils. However, in FIG. 16(ii) full thrust is no longer achieved because the intercepted areas of the coil segments are now different; and so on for FIGS. 16(iii) through 16(vi).

If no correcting mechanism was employed and the current was allowed to remain constant at its peak value in all coils then the force generated would vary by 32% during the thrusting movement illustrated in this example. This would not of course be acceptable in a simulator application although it might be so in an industrial application with no extreme sensitivity to force changes. In later sections of this document we describe alternative or combinational means of smoothing the force output.

TRANSISTOR COIL SWITCHING

FIG. 17 shows a complementary H.F. coil drive arrangement whereby a coil 170 having a common return to zero potential may be connected to a positive or negative DC power supply via transistors x or y. In operation, transistor x or transistor y is used as a high frequency switch, being either saturated ON or totally switched OFF and being modulated such that the mark:space ratio of the ON time to the OFF time determines the mean current in the coil.

The protective diodes d1 and d2 across the switching transistors are necessary to prevent voltage overswings of the coil connection voltage. For example, if transistor x is turned hard ON for a fraction of a second, current begins to build up in the coil. When transistor x is suddenly switched OFF the potential at q will swing hard negative until clipped by the diode d2 at negative rail voltage. The current will then begin to decay in the coil until transistor x is turned hard ON again, causing the current to increase in a positive direction. Similar considerations apply to negative coil currents and to the positive supply protection diode.

The drive wave form to the switching transistors may be pre-determined by the microprocessor controlling the position actuator and will take into account the following parameters:

Relative positions of magnet and coil assemblies.
Desired position of the actuator.
Desired velocity of the actuator.
Desired acceleration of the actuator.
Approach to limiting positions (eg. end stops).
Emergency conditions (eg. function upon power failure).
Current modulation to smooth force ripple.
Compensation for variable coil efficiency.
Inductive time constant of the actuator coil section.

Force or acceleration feedback may be superimposed on the programmed variation. (See sections AG and AH.)

AC. TRIAC SWITCHING

FIG. 18 illustrates an arrangement of coil control in which a single low-cost triac element replaces the two switching power transistors and two diodes illustrated in the previous section.

One end of the coil is now permanently connected to an alternating power supply which is switched between plus V and minus V at a high frequency (in excess of 1 KHz) by an inverter system operating from a mains power supply bridge rectifier system used to charge two accumulators.

It will be clear that if the trigger voltage f is applied when the alternating voltage is at v plus, then current will flow through the coil in one direction, whilst if the trigger voltage f is present when the supply is at v minus then current will flow through the coil in the opposite direction. (The triac is capable of conducting with the voltage in either sense).

The mean current through the coil can be varied by controlling the instant during the power supply cycle at which the trigger voltage is applied to the triac. The current having built up during one half cycle, the triac turns off as the current decays to zero during the next half cycle under the influence of the voltage of opposite polarity applied to the coil element.

It should be noted that, if the actuator has been accelerated up to a speed of 50 cms per second and the width of a coil is in the order of 1 cm (so that switching must occur over a distance in the order of 1 mm) then the switch transition time is required to be 1/500th of a second or 2 msec.

These parameters set an upper limit on the inductance of the coil segment. For instance, if a current of 10 amps is required to build up in a time of 0.5 m seconds from a power supply of 50 volts then the inductance of the coil must be less than 2.5 mH.

AD. DC POWER SUPPLIES

It will be clear that the system is dependent on the existence of DC power supplies from which a current in the order of 30 amps (10 amps per actuator) may be drawn for a period in the order of 0.1 seconds. It is anticipated that such a power supply can be constructed from a bridge-rectified mains power supply source which supports a rechargeable battery acting as an energy reservoir.

The advantage of this technique is that a power supply reserve is retained in the accumulators which will allow the predetermined emergency procedures (for example, levelling and lowering the capsule) to be carried out with adequate power reserve.

AE. AC POWER SUPPLIES (MAINS)

Triac-controlled coil systems are a simple and low-cost means of controlling high currents in actuator coil assemblies. The disadvantage of a 50 Hz or 60 Hz mains supply is the relative slowness of action in turning off an energized coil, of whatever inductance. This can be compensated-for by applying power in the opposite sense to an adjacent coil but clearly this is rather wasteful of power.

The disadvantages of a mains frequency alternating current supply are probably acceptable for all but the most exacting applications.

AF. AC POWER SUPPLIES (INVERTER)

An AC mains supply of any frequency can be generated by a technique which interposes a high capacity reserve of battery power between the mains and the machine. It is this reserve of battery power which can be used to control the actuators under mains failure conditions for the period of time which is necessary to carry out the safety procedures.

The use of an inverter frequency which is substantially greater than that of the mains frequency allows tighter control of the coil currents, dependent upon the design of the coil system such that the segments possess a low inductance under all circuit conditions.

AG. FORCE FEEDBACK

We have discussed the effect of finite sized coil segments in producing a thrust which, were the current in the coils not to be varied, would contain a significant force ripple.

Whilst a pre-calculated variation of current can be controlled by the microprocessor element having an accurate position feedback from a position transducer element within the system, there will also be variations between one magnet segment and another and minor variations of flux path symmetry which will produce small variations in the force generated by the piston as it travels down the cylinder.

Finally, as has been explained in earlier documents, the thermodynamic variations in the gas spring beneath the piston (when present), upon which the electromagnetic forces are superimposed, will also cause transient variations in the net thrust from the actuator.

(The temperature of the gas will change as a result of the adiabatic volume change caused by a sudden movement of the piston. There will be a short time delay before the heat flow restores the original gas temperature, which will vary the portion of the thrust due to the air pressure on the piston. This will require a continuous change in electromagnetic thrust to compensate).

A force feedback element 190, is therefore interposed between the piston and the piston shaft and the signals from this force sensing element are fed into the control system as a final variance parameter, as shown in FIG. 19.

The force sensing element might be a pressure sensitive resistor, a system of strain gauges or any other element which produces an output which varies with the force applied in a positive or negative sense.

AH. ACCELERATION FEEDBACK

In that the purpose of the actuator is to induce accelerations in a load, the precise value of that load not being pre-determined, it is necessary to incorporate within a control loop an acceleration feed back transducer 192. The transducer(s) may be mounted as a part of the load (for example, in the case of a simulator mechanism, they may be mounted within the capsule). Or, in the alternative, they may be incorporated within the actuator itself. For example, the accelerometer may be mounted in the piston element in the same way as we have previously described for the force sensing transducer. See FIG. 20.

When the accelerometer transducer is used it is no longer necessary to incorporate a force sensing resistor because, acceleration being proportional to the force, the signal from the accelerometer also contains the necessary information on instantaneous force. This may be, used in a feed back system to control the current in the actuator coils to take account of all those factors which cause force variation and which we have discussed in earlier sections.

THRUSTRODS

We have earlier explained our reasons for placing the air gap containing the current-carrying coils on one side only of the magnetic circuit. That is to say, in a moving coil system the magnets may be arranged on the inside of the outer steel cylinder and the piston may move along the central line of the cylinder inside it. For an equivalent moving magnet system the electrical coils are arranged along the inside of the outer steel cylinder and the magnet assembly ("piston") moves along the axis of the cylinder. In either of these two arrangements it is clear that the thrust rod is fixed to the moving element or piston and protrudes through the end of the cylinder via a slide bearing in exactly the same way as a conventional pneumatic or hydraulic ram.

But it is possible to conceive of a moving-coil system which is carried on a sleeve over a fixed central rod within a steel cylinder lined with radial-field magnets. Such an arrangement results in a piston of minimum weight. In this case the central rod may be constructed to incorporate magnetic elements matched to the magnetic elements of the outer cylinder so that the coil moves in the air gap between two permanent magnetic materials. In the alternative, the inner rod may simply be of iron and the coil then moves as a cylinder sliding on that rod within an outer cylinder.

The problem, of course, is that if the central steel rod is assumed to be fixed to closing discs at both ends of the cylinder it is difficult to bring the thrust out of the system.

We conceive of the moving sleeve being connected to the outside world through a number (say 3) of rods 210 which pierce the disc closure 212 at one end of the cylinder through separate gland seals for each rod, as shown in FIG. 21. A similar arrangement would be necessary for a moving magnet sleeve which would move between coils on the inside of the outer steel case and on the outside of the inner steel rod.

AK. ELECTRICAL CONNECTIONS

Electrical connections to the coil segments of a moving magnet system are relatively straightforward, since the coils form part of the stator, which is the external element. If solid state switching is employed, a set of switching transistors and a triac element may be mounted adjacent to each coil section or as a bank in a separate controller to which coil connections are carried as twisted pairs.

FIG. 14 illustrates an equivalent system in which the commutation is mechanical, using brushes bearing on a commutator strip. In this case although the coils are stationary, the power to the brushes must be fed to a moving piston.

For a moving coil system, the control elements of FIG. 17 may be mounted on the moving piston assembly, to which the power supply is carried as a 3-wire system in the same way as in FIG. 14. In the alternative, the control elements are mounted external to the actuator assembly where they can be maintained in a cooler environment and the coil connections are brought out as twisted pairs.

The problem which is common to these systems is that the cable must be very flexible, and it must be controlled to retract into a small space at one end of the piston cylinder.

The cable may be of the ribbon type, as used in printers and plotter units, spring loaded so as to retract into a folded assembly. The assembly of folded cable may be housed within a cavity on the face of the piston unit or in a cavity at the base end of the actuator cylinder, as shown in FIG. 22. To facilitate the use of such ribbon cable the design of the coil windings should be arranged to have a current rating of less than one amp. and a peak voltage requirement of less than 150 volts.

ASSEMBLY. AL

We have described a moving-magnet system in which the stator comprises an outer steel cylinder lined with a series of copper wire coil sections, which must, of course, be wound on an inner liner and then slipped into the steel cylinder. (During the winding process the thin liner is fitted over a rigid cylinder or shaft to resist the compressive stress s of the necessary winding tension).

The moving (piston) assembly of magnets and thrust rod may then be inserted into the liner and the end piece or pieces added to complete the unit.

However, in the case of a moving-coil system the stator comprises an outer steel cylinder lined with a series of rings of magnetic material, magnetized in opposite directions alternately. It will be clear that, were the magnets to be assembled on the outside of a non-magnetic liner (temporarily fitted over a steel cylinder or rod to retain the magnets in position) it would not actually be possible to insert the magnet array into the outer cylinder because of the clamping effect of the magnets.

One practical method of assembly is shown in FIG. 23. Here the outer cylinder is split into two halves and the magnet segments are placed as "tiles" on the exposed inner surface of the cylinder, with suitable aluminium or plastic spacing elements. The moving-coil piston unit is then inserted into a thin non-magnetic sleeve which is placed in one assembled half of the stator whilst the other half is aligned and brought together to complete the assembly.

(It should be noted that there will be a force between the two stator pieces in an axial direction until the assembly is completed, owing to the tendency of the magnet half rings to seek alignment with half rings of opposite polarity.)

This method of assembly is particularly convenient for the use of moulded ferrite sheet material which may be formed as flat sheet "striped" with magnets of alternate polarity. The sheets are simply laid into the steel half cylinders, into one of which the lining tube and piston assembly is placed before the two halves are brought together.

An alternative method of assembly for long stator tubes is to construct them as modular assemblies of length equal to two magnet rings and two spacers, perhaps with a temporary inner steel ring "keeper". Since the modules have no unbalanced magnetic fields they can be stored, transported and brought together as necessary to form stator assemblies into which the airtight liner and piston assembly may then be inserted.

The innovative features which we have described in this document are:

The two stage topological transformation of electric motor systems to cylindrical actuators.

The design of electromagnetic actuators having no external fields.

The use of disc or plate magnets to produce piston assemblies.

The use of radially-magnetized segments to produce piston assemblies.

The use of radially-magnetized segments to produce stator sleeves in which a moving coil assembly moves as a piston.

The design of rectangular tube thrust assemblies using plate magnets.

The design of solid state commutated coils of finite width, such that $nx = y + 21$.

The use of current control in finite width commutated segments to linearize actuator thrust.

The use of force sensing elements to compensate for unpredictable and/or fast acting variable transient changes in actuator thrust.

The use of accelerometer feedback to control the current in actuator coils, so as to smoothe thrust variations and to compensate for actuator attitude.

The design of a universal (AC or DC) electromagnetic actuator system.

The design of linear actuators having travelling waves in both stator and piston, the phase relationship between the waves determining the force acting on the piston.

The use of a phase control to lock the piston at a node position in such a travelling wave system.

The design of inductively-coupled cylindrical piston travelling wave actuator systems.

The use of servo-assisted inductively-coupled piston actuators for increased thrust at low relative speeds.

The use of phase control to modify the force and direction of the thrust in an alternating current bi- or tri-phase actuator system.

The combination of Hall-effect commutator switching and force-feedback thrust control.

The use of a microprocessor and a position transducer to produce a smooth actuator output thrust by predicted current variation.

The combination of position transducer predetermined current variation and dynamic feedback from a force-sensing or acceleration-sensing transducer.

The use of triac switching elements to control the amplitude and direction of current in commutated coil elements.

A technique of assembly using a cylindrical outer housing split along its length into two or more pieces to provide easy access to internal areas.

A technique of assembly using a cylindrical outer housing cut into shorter sections or modules and abutted after partial assembly.

The use of moulded Ferrite material to produce a single-piece assembly of magnets which may be laid in (each half of) a split steel cylinder stator assembly.

The use of moulded Ferrite material to produce a single-piece assembly of magnets which may be laid upon (each half of) a steel cylinder piston assembly.

The construction of actuator coils, directly or as preformed and stacked assemblies, on ribbed (ringed) steel cylinders to reduce the magnetic reluctance and to couple the reaction forces to the thrust components.

I claim:

1. An electromagnetic piston and cylinder device comprising a cylinder assembly including an elongate cylinder of magnetic material and means for producing a cylinder magnetic field pattern comprising a series of alternate radially directed magnetic poles along the length of the cylinder, a piston member mounted within the cylinder assembly and having means for creating a radial magnetic field pattern for cooperating with the cylinder magnetic field pattern such that the magnetic fields are contained within the cylinder, a means for modulating the strength and polarity of at least one of the cylinder or piston magnetic field patterns whereby to cause relative linear thrust between the cylinder assembly and piston member, characterised in that the means for producing the cylinder magnetic field pattern comprises means for generating radial magnetic fields within the interior of the cylinder, in that the piston member is shorter in axial length than the cylinder, in that the cylinder is closed at both ends by end members with the piston member being provided with a rod extending through one of the end members, and in that the interior of the cylinder communicates with a fluid reservoir.

2. A piston and cylinder device according to claim 1 wherein the cylinder radial fields are produced by permanent magnets.

3. A piston and cylinder device according to claim 1, wherein the cylinder radial fields are provided by current carrying coils.

4. A piston and cylinder device according to claim 3, wherein the piston radial field is provided by one or more permanent magnets.

5. A piston and cylinder device according to claim 2, wherein the piston radial field is provided by a plurality of current carrying coils.

6. A piston and cylinder device according to claim 5, wherein the cylinder is of circular cross-sectional shape.

7. A piston and cylinder device according to claim 6, wherein the cylinder is of nob-circular cross-sectional shape.

8. A piston and cylinder device according to claim 7, wherein the fluid is a gas.

9. A piston and cylinder device according to claim 1, wherein the piston is provided with one or more transducers for influencing the condition of the control means according to the movement of the piston.

10. A piston and cylinder device according to claim 9, wherein one of the transducers is an accelerometer.

11. A piston and cylinder device according to claim 10, wherein one of the transducers is a force transducer located between the piston and actuator rod.

12. A piston and cylinder device according to claim 11 wherein one of the transducers is a position sensing device.

13. An electromagnetic piston and cylinder device comprising a cylinder assembly including an elongate cylinder of magnetic material and means for producing a cylinder magnetic field pattern comprising a series of alternate radially directed magnetic poles along the length of the cylinder, a piston member mounted within the cylinder assembly and having means for creating a radial magnetic field pattern for cooperating with the cylinder magnetic field pattern such that the magnetic field are contained within the cylinder, a means for modulating the strength and polarity of at least one of the cylinder or piston magnetic field patterns whereby to cause relative linear thrust between the cylinder assembly and piston member, characterised in that the means for producing the cylinder magnetic field pattern comprises means for generating radial magnetic fields within the interior of the cylinder, and in that the means for producing the cylinder magnetic field pattern comprises means for generating radial magnetic fields within the interior of the cylinder, in that the piston member is shorter in the axial length that the cylinder, and in that the piston field pattern creating means comprise radially magnetised permanent magnets axially spaced from each other to create a central pole of one direction of magnetisation and two further poles spaced apart on either side of the central pole and having the opposite direction of magnetisation.

14. A piston and cylinder device according to claim 13, wherein the cylinder radial fields are provided by current carrying coils.

15. A piston and cylinder device according to claim 13, wherein the cylinder is of circular cross-sectional shape.

16. A piston and cylinder device according to claim 13, wherein the cylinder is of non-circular cross-sectional shape.

17. A piston and cylinder device according to claim 13, wherein the cylinder is sealed and the interior of the cylinder communicates with a fluid reservoir, (whereby to operate a combined spring and actuator).

18. A piston and cylinder device according claim 17, wherein the fluid is a gas.

19. A piston and cylinder device according to claim 13, wherein the piston is provided with one or more transducers for influencing the condition of the control means according to the piston.

20. A piston and cylinder device according to claim 19, wherein one of the transducers is an accelerometer.

21. A piston and cylinder device according to claim 19, wherein one of the transducers is a force transducer located between the piston and actuator rod.

22. A piston and cylinder device according to claim 19 wherein one of the transducers is a position sensing device.

* * * * *